US012683659B2

(12) United States Patent
Lee et al.

(10) Patent No.:  US 12,683,659 B2
(45) Date of Patent:       Jul. 14, 2026

(54) METHOD AND DEVICE FOR PERFORMING IMPROVED BEAM TRACKING IN NEXT-GENERATION WIRELESS COMMUNICATION SYSTEM

(71) Applicant: Samsung Electronics Co., Ltd., Gyeonggi-do (KR)

(72) Inventors: Sangho Lee, Gyeonggi-do (KR); Sungjin Shin, Gyeonggi-do (KR); Byunghyun Lee, Gyeonggi-do (KR); Jungsoo Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 36 days.

(21) Appl. No.: 18/254,411

(22) PCT Filed: Dec. 6, 2021

(86) PCT No.: PCT/KR2021/018369
§ 371 (c)(1),
(2) Date: May 25, 2023

(87) PCT Pub. No.: WO2022/124733
PCT Pub. Date: Jun. 16, 2022

(65) Prior Publication Data
US 2023/0421224 A1      Dec. 28, 2023

(30) Foreign Application Priority Data
Dec. 10, 2020    (KR) ........................ 10-2020-0171941

(51) Int. Cl.
*H04B 7/06*          (2006.01)
*H04B 17/318*        (2015.01)
(52) U.S. Cl.
CPC ......... *H04B 7/0626* (2013.01); *H04B 7/0632* (2013.01); *H04B 7/0639* (2013.01); *H04B 17/328* (2023.05)

(58) Field of Classification Search
CPC .. H04B 7/0626; H04B 7/0632; H04B 7/0639; H04B 7/0696; H04B 7/088;
(Continued)

(56) References Cited

U.S. PATENT DOCUMENTS 7,444,157 B2    10/2008  Hovers et al.
9,960,839 B2     5/2018  Jung
(Continued)

FOREIGN PATENT DOCUMENTS

CN          109845137        6/2019
CN          111162827        5/2020
(Continued)

OTHER PUBLICATIONS

Zhou et al. (NPL titled: "Low Probability of Intercept Communication Based on Structured Radio Beams Using Machine Learning," in IEEE Access, vol. 7, pp. 169946-169952, 2019) (Year: 2019).*
(Continued)

*Primary Examiner* — Sam K Ahn
*Assistant Examiner* — Amneet Singh
(74) *Attorney, Agent, or Firm* — The Farrell Law Firm, P.C.

(57)          ABSTRACT

The present disclosure relates to a 6G communication system for accomplishing ultra-low delay time and a data transmission rate higher than that of 4G and 5G communication systems. According to embodiments of the present disclosure, a base station can match (or map), to a channel state information-reference signal (CSI-RS), beams having a high probability of being selected as the beam with the best performance at the location of a terminal, and can provide the CSI-RS to the terminal. Therefore, the possibility of the inclusion of the beams with the best performance from among the beams corresponding to the CSI-RS can be increased. Thus, beam tracking with more improved perfor-
(Continued)

mance can be performed when a beamforming technology is operated in millimeter wave and terahertz bands, or ultra-high frequency bands or higher.

11 Claims, 21 Drawing Sheets

(58) Field of Classification Search
CPC .............. H04B 7/06952; H04B 7/0617; H04B 7/0695; H04B 7/086; H04B 17/318; G01S 5/0205; G01S 17/42; H04L 5/005; H04L 5/0023; H04L 5/0057
See application file for complete search history.

(56) References Cited

U.S. PATENT DOCUMENTS

| | | | |
|---|---|---|---|
| 10,425,139 B2 | 9/2019 | Guo et al. | |
| 10,530,453 B1 | 1/2020 | Sung et al. | |
| 10,530,454 B2 | 1/2020 | Nilsson et al. | |
| 10,944,455 B2 | 3/2021 | John Wilson et al. | |
| 11,129,200 B2 | 9/2021 | Takeda et al. | |
| 11,723,022 B2 | 8/2023 | Guan et al. | |
| 12,095,541 B2 | 9/2024 | Chen et al. | |
| 2010/0177725 A1* | 7/2010 | van Rensburg | H04W 72/046 |
| | | | 370/329 |
| 2014/0055302 A1 | 2/2014 | Jia | |
| 2017/0325221 A1 | 11/2017 | Jalali | |
| 2019/0097712 A1 | 3/2019 | Singh et al. | |
| 2019/0207665 A1 | 7/2019 | Yang et al. | |
| 2019/0268053 A1* | 8/2019 | John Wilson | H04B 7/0695 |
| 2020/0322035 A1* | 10/2020 | Shi | H04W 72/046 |
| 2021/0385896 A1 | 12/2021 | Kim | |
| 2022/0029286 A1 | 1/2022 | Cho et al. | |
| 2022/0070843 A1* | 3/2022 | Levitsky | H04W 72/046 |
| 2022/0110004 A1* | 4/2022 | Horn | H04W 24/08 |
| 2023/0086334 A1 | 3/2023 | Chen et al. | |

FOREIGN PATENT DOCUMENTS

| | | |
|---|---|---|
| CN | 111788857 | 10/2020 |
| KR | 1020190047194 | 5/2019 |
| KR | 10-2019-0076659 | 7/2019 |
| KR | 10-2114908 | 5/2020 |
| KR | 10-2020-0061808 | 6/2020 |
| WO | WO 2018/012619 | 1/2018 |
| WO | WO 2019/029433 | 2/2019 |
| WO | WO 2020/085808 | 4/2020 |

OTHER PUBLICATIONS

PCT/ISA/210 Search Report issued on PCT/KR2021/018369, Mar. 3, 2022 pp. 5.

PCT/ISA/237 Written Opinion issued on PCT/KR2021/018369, Mar. 3, 2022 pp. 4.

European Search Report dated Feb. 28, 2024 issued in counterpart application No. 21903779.3-1206, 11 pages.

Korean Office Action dated Nov. 20, 2024 issued in counterpart application No. 10-2020-0171941, 8 pages.

Chinese Office Action dated Apr. 30, 2026 issued in counterpart application No. 202180083570.X, 20 pages.

* cited by examiner

Beam indication

FIG. 7

Beams with large number of times of selection from cluster
corresponding to location of corresponding terminal

FIG. 10B

| Location X | Location Y | Cluster (Cluster ID) |
|---|---|---|
| 40 | 0 | 1 |
| 40 | 5 | 2 |
| 40 | 10 | 2 |

| | |
|---|---|
| Identify location information of terminal | ~1301 |
| Transmit SSB | ~1302 |
| Receive information about best beam | ~1303 |
| Identify location-specific beam pattern based on location information and information about best beam | ~1304 |
| Identify cluster information based on location-specific beam pattern | ~1305 |
| Transmit cluster information | ~1306 |

METHOD AND DEVICE FOR PERFORMING IMPROVED BEAM TRACKING IN NEXT-GENERATION WIRELESS COMMUNICATION SYSTEM

PRIORITY

This application is a National Phase Entry of PCT International Application No. PCT/KR2021/018369, which was filed on Dec. 6, 2021, and claims priority to Korean Patent Application No. 10-2020-0171941, which was filed on Dec. 10, 2020, the entire content of each of which is incorporated herein by reference.

TECHNICAL FIELD

The disclosure relates to operations of a terminal and a base station in a next-generation wireless communication system. In particular, the disclosure relates to a beam tracking method with improved performance, in performing signal transmission/reception between a terminal and a base station by applying beamforming technology in a system based on ultra-high frequency bands such as millimeter wave (mmWave) (e.g., 28 GHz, terahertz (THz), or higher ultra-high frequency bands), and an apparatus capable of performing the same.

BACKGROUND ART

A review of the development of wireless communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as beyond-5G systems. 6G communication systems, which are expected to be implemented approximately by 2030, will have a maximum transmission rate of tera (1,000 giga)-level bps and a radio latency of 100 μsec, and thus will be 50 times as fast as 5G communication systems and have the ¹/₁₀ radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

Meanwhile, research on the 6G communication system or next-generation wireless communication system as described above pays attention to, particularly, beamforming technology and a method for enabling the beamforming technology to be operated more effectively, as a method for solving the problem of a reduction in the coverage of a base station that may occur during signal transmission/reception in millimeter wave and terahertz bands, or higher ultra-high frequency bands and communication service quality degradation according thereto.

DISCLOSURE OF INVENTION

Technical Problem

As described above, in a 6G communication system or a next-generation wireless communication system to which the disclosure can be applied, signal transmission/reception in millimeter wave and terahertz (THz) bands, or higher ultra-high frequency bands is considered to ensure a higher signal transmission rate. On the other hand, the degree of signal attenuation by distance increases as a higher frequency band is used, and thus a reduction in the coverage of the base station due to signal attenuation is unavoidable. In order to solve this coverage reduction problem, in a 6G communication system or a next-generation wireless communication system to which the disclosure can be applied, a method for applying a beamforming technology to amplify signal strength so as to perform signal transmission/reception between a terminal and a base station can be considered. However, even when signal transmission/reception is performed between a terminal and a base station based on the beamforming technology, the signal strength amplification effect of the beamforming technology may be rapidly attenuated according to changes in the surrounding communication environment, such as movement of the terminal. That is, in the ultra-high frequency band, the beamforming technology may not be effectively operated depending on the communication environment. In addition, since it may be difficult to select an appropriate beam in a communication environment in which a large number of beams are used, the beamforming technique may not be effectively operated. Therefore, in a 6G communication system or a next-generation wireless communication system to which the disclosure can be applied, there is a need to devise a beam tracking (or beam management) method enabling determining the best-performing beam, continuously tracking changes in the beam, and exchanging information on the state of a beam between a terminal and a base station, so as to perform more stable and efficient operation of the beamforming technology.

<div align="center">Solution to Problem</div>

In order to solve the above problems, according to an embodiment of the disclosure, a method by a terminal in a communication system is provided. The method by a terminal includes receiving a message including cluster information from a first base station, identifying whether a cluster corresponding to the location of the terminal is changed, based on the cluster information and location information of the terminal, and in case that the cluster is changed, transmitting a channel state information (CSI) report including information about the changed cluster to the first base station, wherein the cluster information includes information about at least one cluster identified based on a location-specific beam pattern, and wherein the location-specific beam pattern is identified based on information about a best beam and location information for each of a plurality of terminals served by the first base station.

Further, according to an embodiment of the disclosure, a method by a first base station in a communication system is provided. The method by a first base station includes transmitting a message including cluster information to a terminal, in case that a cluster corresponding to the location of the terminal is changed, receiving a channel state information (CSI) report including information about the changed cluster from the terminal, identifying at least one beam corresponding to a channel state information-reference signal (CSI-RS) based on the information about the changed cluster, and transmitting the CSI-RS to the terminal based on the identified at least one beam, wherein the cluster information includes information about at least one cluster identified based on a location-specific beam pattern, and wherein the location-specific beam pattern is identified based on information about a best beam and location information for each of a plurality of terminals served by the first base station.

In addition, according to an embodiment of the disclosure, a terminal of a communication system is provided. The terminal includes a transceiver, and a controller connected to the transceiver and configured to receive a message including cluster information from a first base station, identify whether a cluster corresponding to the location of the terminal is changed, based on the cluster information and location information of the terminal, and in case that the cluster is changed, transmit a channel state information (CSI) report including information about the changed cluster to the first base station, wherein the cluster information includes information about at least one cluster identified based on a location-specific beam pattern, and the location-specific beam pattern is identified based on information about a best beam and location information for each of a plurality of terminals served by the first base station.

In addition, according to an embodiment of the disclosure, a first base station of a communication system is provided. The first base station includes a transceiver, and a controller connected to the transceiver and configured to transmit a message including cluster information to a terminal, in case that the cluster corresponding to the location of the terminal is changed, receive a channel state information (CSI) report including information about the changed cluster from the terminal, identify at least one beam corresponding to a channel state information-reference signal (CSI-RS) based on the information about the changed cluster, and transmit the CSI-RS to the terminal based on the identified at least one beam, wherein the cluster information includes information about at least one cluster identified based on a location-specific beam pattern, and wherein the location-specific beam pattern is identified based on information about a best beam and location information for each of a plurality of terminals served by the first base station.

<div align="center">Advantageous Effects of Invention</div>

According to the disclosure, there is provided a method for managing beams for each cluster by clustering a location-specific beam pattern by a base station and sharing a result of the clustering with a terminal. Accordingly, the base station may match (or map) a beam having a high probability of being selected as the best performing beam to a channel state information-reference signal (CSI-RS) based on a beam pattern corresponding to a cluster to which the location of a terminal belongs and transmit this CSI-RS to the terminal, to thereby obtain the effect of performing beam tracking with more improved performance.

Furthermore, according to an embodiment proposed in the disclosure, beam management is enabled for each cluster, and thus even in communication having a large number of beams used (e.g., terahertz (THz) communication, vehicle communication, or RIS-based communication), a beam with good performance to be used for signal transmission and reception can be determined more quickly.

Advantageous effects obtainable from the disclosure may not be limited to the above-mentioned effects, and other effects which are not mentioned may be clearly understood, through the following descriptions, by those skilled in the art to which the disclosure pertains.

<div align="center">BRIEF DESCRIPTION OF DRAWINGS</div>

The above and other objectives, features and advantages of the disclosure will become clearer through the following description of embodiments of the disclosure with reference to the accompanying drawings:

FIG. 7 illustrates a process of performing beam tracking according to an embodiment of the disclosure;

FIG. 10B illustrates an example of a method for clustering a location-specific beam pattern by a base station according to an embodiment of the disclosure;

MODE FOR THE INVENTION

Figure 1:
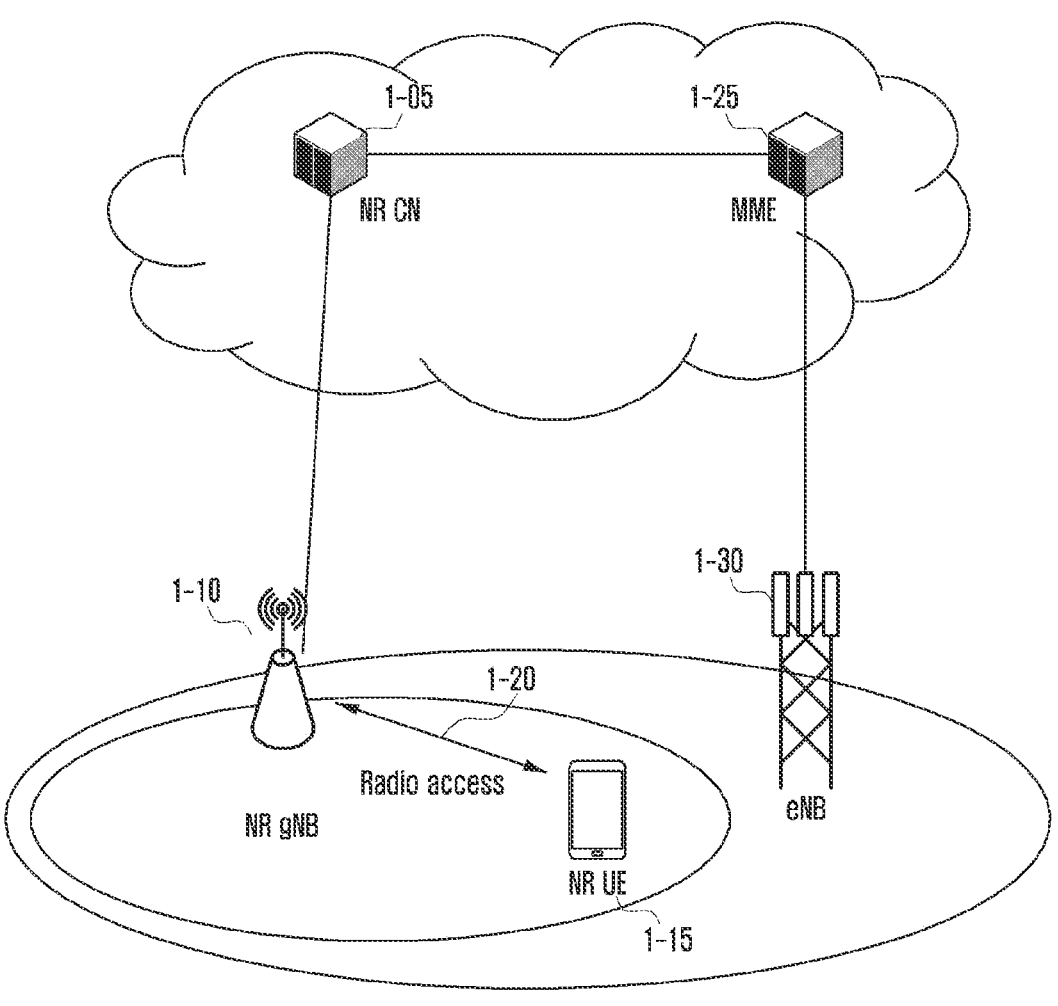
FIG. 1 illustrates the structure of a new radio (NR or 5G) system according to the disclosure.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. In the following description, some of terms and names defined in the 3rd generation partnership project (3GPP) standards (standards for 5G, NR, long term evolution (LTE), or similar systems) may be used for the convenience of description. Moreover, terms and names newly defined in a next-generation communication system (e.g., 6G or beyond 5G system) to which the disclosure is applicable or employed in the existing communication systems may also be used. The use of terms and names is not limited by the terms and names of the disclosure, and the disclosure may be applied in the same way to systems that conform other standards and may be changed into other forms without departing from the technical idea of the disclosure. In an embodiment of the disclosure, it is to be understood that the singular forms "a," "an," and "the" include plural referents unless the context clearly dictates otherwise.

In an embodiment of the disclosure, the terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure.

In an embodiment of the disclosure, the term "and/or" includes any one of any combination of multiple relevant items enumerated.

The terms used in the disclosure are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

As used in an embodiment of the disclosure, the phrases "associated with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

Before the detailed description of the disclosure, examples of construable meanings of some terms used herein are given below. However, it should be noted that the terms are not limited to the examples of the construable meanings as given below.

In the disclosure, a terminal (or communication terminal) is an entity that communicates with a base station or any other terminal, and may be referred to as a node, a user equipment (UE), a next generation UE (NG UE), a mobile station (MS), a device, a terminal, or the like. The terminal may include at least one of a smartphone, a tablet personal computer (PC), a mobile phone, a video phone, an electronic book reader, a desktop PC, a laptop PC, a netbook computer, a personal digital assistant (PDA), a portable multimedia player (PMP), an MP3 player, a medical device, a camera, and a wearable device. Also, the terminal may include at least one of a television, a digital video disk (DVD) player, an audio, a refrigerator, an air conditioner, a vacuum cleaner, an oven, a microwave oven, a washing machine, an air purifier, a set-top box, a home automation control panel, a security control panel, a media box, a game console, an electronic dictionary, an electronic key, a camcorder, and an electronic photo frame. In addition, the terminal may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, a drone, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.). However, the disclosure is not limited by the above examples, and the terminal may also be referred to by terms having the same or similar meanings.

In the disclosure, a base station is an entity that communicates with terminals and allocates resources to the terminals, and may be referred to as a base station (BS), a Node B (NB), a next generation radio access network (NG RAN), an access point (AP), a transmission reception point (TRP), a wireless access unit, a base station controller, a node on a network, or the like. Alternatively, according to function split, the base station may be referred to as a central unit (CU) or a distributed unit (DU). However, the disclosure is not limited by the above examples, and the base station may also be referred to by terms having the same or similar meanings.

In the disclosure, the term "high level message" may be referred to as "high level signal", "high level signaling", "high layer signaling", "upper layer signaling", or "radio resource control (RRC) message", and the disclosure is not limited by them and the term may also be referred to as other terms having the same or like meaning.

In addition, in the embodiments of the disclosure, the best beam (or best beams) may imply two beams in one beam pair (or beam pairs) configured by beams at a transmitter side or receiver side, the two beams configured by one beam at the transmitter side and one beam at the receiver side and measured to have the best performance among beams usable by the transmitter side and the receiver side. That is, according to an embodiment of the disclosure, the best beam may imply a best transmission beam at the transmitter side or a best reception beam at the receiver side. Meanwhile, in the disclosure, a beam with good performance may imply that the received signal strength (e.g., reference signal received power (RSRP)) for the beam is equal to or greater than a predetermined threshold value, or that the channel quality for the beam is good. In addition, in the embodiments of the disclosure, the best beam may generally imply a transmission beam with the best performance, used by a base station to communicate with a terminal, within the best beam pair measured according to the reference signal transmitted by the base station, or may imply the top-ranked N beams in terms of performance. Further, the disclosure is not limited thereto, and may refer to various examples of the best beam described in the embodiments of the disclosure.

FIG. 1 illustrates the structure of a new radio (NR or 5G) system according to the disclosure. Referring to FIG. 1, as shown in the drawing, a radio access network of the NR system may include an NR base station (new radio Node B or NR gNB) 1-10 and an NR core network 1-05. An NR terminal (or NR UE) 1-15 may access an external network through the NR gNB 1-10 and the NR core network 1-05.

In FIG. 1, the NR gNB 1-10 corresponds to an evolved Node B (eNB) of a conventional LTE system. The NR gNB may be connected to an NR UE 1-15 through a radio channel and may provide better service than a conventional node B. Since all user traffic is served through a shared channel in the NR system, a device for collecting and scheduling status information of buffer statuses, available transmission power statuses, and channel statuses of UEs is required, and the NR gNB 1-10 performs the above-described function. One NR gNB generally controls a plurality of cells. In the NR system, data transmission/reception may be performed based on a bandwidth equal to or wider than the conventional maximum bandwidth in order to implement super-high-speed data transmission compared to the LTE system and may apply orthogonal frequency division multiplexing (OFDM) as radio access technology. Further, a modulation scheme and an adaptive modulation and coding (AMC) scheme of determining a channel coding rate are applied in accordance with a channel status of the UE. The NR core network 1-05 may perform a function of supporting mobility, configuring a bearer, configuring a QoS, and the like. The NR core network is a device for performing a function of managing the mobility of the UE and various control functions, and may be connected to a plurality of gNBs. Further, the NR system may be linked to the conventional LTE system, and the NR core network 1-05 may be connected to a mobility management entity (MME) 1-25 through a network interface. The MIME 1-25 may be connected to an LTE eNB 1-30, which is a base station of the LTE system.

Meanwhile, in the NR system according to the disclosure, blind decoding is performed in a specific time and frequency domain to receive a PDCCH including DCI. A base station may configure a control resource set (CORESET) and a search space in a terminal through a higher-level message in order to provide a time and a frequency domain, and mapping method for the terminal to perform blind decoding. The base station may configure up to 3 CORESETs and up to 10 search spaces for each bandwidth part (BWP) configured in the terminal. As an example, the base station and the terminal may transmit and receive signaling information as shown in [Table 1] below to deliver information on CORE-SET.

TABLE 1

ControlResourceSet information element

```
-- ASN1START
-- TAG-CONTROLRESOURCESET-START
ControlResourceSet ::=                          SEQUENCE {
    controlResourceSetId                           ControlResourceSetId,
    frequencyDomainResources                       BIT STRING (SIZE (45)),
    duration                                       INTEGER (1..maxCoReSetDuration),
    cce-REG-MappingType                            CHOICE {
        interleaved                                    SEQUENCE {
            reg-BundleSize                                 ENUMERATED {n2, n3, n6},
            interleaverSize                                ENUMERATED {n2, n3, n6},
            shiftIndex                             INTEGER(0..maxNrofPhysicalResourceBlocks−1)
                                                       OPTIONAL -- Need S
        },
        nonInterleaved                                 NULL
    },
    precoderGranularity                                ENUMERATED   {sameAsREG-bundle,
                                               allContiguousRBs},
    tci-StatesPDCCH-ToAddList                           SEQUENCE(SIZE (1..maxNrofTCI-StatesPDCCH)) OF
TCI-StateId OPTIONAL, -- Cond NotSIB1-initialBWP
    tci-StatesPDCCH-ToReleaseList                       SEQUENCE(SIZE (1..maxNrofTCI-StatesPDCCH)) OF
TCI-StateId OPTIONAL, -- Cond NotSIB1-initialBWP
    tci-PresentInDCI                                   ENUMERATED   {enabled}
OPTIONAL, -- Need S
    pdcch-DMRS-ScramblingID                              INTEGER   (0..65535)
OPTIONAL, -- Need S
    ...
```

TABLE 1-continued

ControlResourceSet information element

```
}
-- TAG-CONTROLRESOURCESET-STOP
-- ASN1STOP
```

The signaling information ControlResourceSet includes information on each CORESET. Information included in the signaling information ControlResourceSet may have the following meanings.

controlResourceSetId: indicates the CORESET index.

frequency Domain Resources: indicates frequency resource information of a CORESET.

With respect to all PRBs included in a BWP, RB groups each including 6 RBs are made, and whether each of the RB groups is included in a CORESET frequency resource is indicated by 1 bit. (1: included in CORESET, 0: not included in CORESET)

duration: symbol level time resource information of a CORESET. The information has one value of 1, 2, or 3.

cce-REG-MappingType: indicates whether control channel elements (CCEs) mapped to a CORESET are interleaved. If a CCE is interleaved, additional information (reg-BundleSize, interleaverSize, and shiftIndex) relating to interleaving is provided.

precoderGranularity: indicates information relating to precoding of frequency resources of a CORESET. The size of a precoder may be the same as a resource element group (REG) bundle size, or the size of all frequency resources of a CORESET.

tci-StatePDCCH-ToAddList, tci-StatePDCCH-ToReleaseList: indicates an activatable transmission configuration indication (TCI) state set of a CORESET. One in an activatable transmission configuration indication (TCI) state set of a CORESET may be activated through L1 signaling (e.g., DCI) or L2 signaling (e.g., MAC CE). If a CORESET is configured in an initial access process, a TCI state set may not be configured. A description of TCI states will be given later.

tci-PresentInDCI: indicates whether an indicator indicating a TCI state of a PDSCH is included in DCI transmitted through a PDCCH included in a CORESET.

Pdcch-DMRS-ScramblingID: a sequence scrambling index of a DMRS transmitted in a PDCCH included in a CORESET.

A terminal may perform blind decoding for receiving a PDCCH by referring to information relating to a CORESET described above.

In NR according to the disclosure, a base station may transfer, to a terminal, information relating to a quasi-co-location (QCL) relationship between antenna ports (e.g., a DMRS port of a PDSCH, a PDCCH DMRS port, or a CSI-RS port of a CSI-RS) transmitting a downlink channel, so that the terminal smoothly receives a downlink channel (e.g., a PDCCH or a PDSCH) and decodes the downlink channel. A QCL relationship between antenna ports may have one of a total of four QCL types.

"QCL-typeA": {Doppler shift, Doppler spread, average delay, delay spread}

"QCL-typeB": {Doppler shift, Doppler spread}

"QCL-typeC": {Doppler shift, average delay}

"QCL-typeD": {Spatial RX parameter}

If two different antenna ports share a part of the QCL types described above, or one antenna port refers to a part of the QCL type of the other antenna port, a terminal may assume that the two antenna ports share a parameter supported in a QCL type, which is shared or referenced by the two antenna ports, and thus have the same values.

A base station may configure a TCI state to transfer information relating to a QCL relationship between antenna ports to a terminal. The TCI state includes information relating to one or two downlink RSs and supported QCL types. For example, the base station and the terminal may exchange signaling information as shown in [Table 2] below to transfer information relating to a TCI state.

TABLE 2

TCI-State information element

```
-- ASN1START
-- TAG-TCI-STATE-START
TCI-State ::=              SEQUENCE {
   tci-StateId               TCI-StateId,
   qcl-Type1                 QCL-Info,
   qcl-Type2                                QCL-Info
OPTIONAL,   -- Need R
   ...
}
QCL-Info ::=              SEQUENCE {
   cell                                     ServCellIndex
OPTIONAL,   -- Need R
   bwp-Id                                   BWP-Id
OPTIONAL, --Cond CSI-RS-Indicated
   referenceSignal        CHOICE {
      csi-rs                 NZP-CSI-RS-ResourceId,
      ssb                    SSB-Index
   },
   qcl-Type               ENUMERATED {typeA, typeB, typeC, typeD},
   ...
}
-- TAG-TCI-STATE-STOP
-- ASN1STOP
```

"TCI-state" included in the signaling information includes information relating to each TCI state. According to the signaling information, each TCI state includes information relating to a TCI state index and one or two types of QCL-Info (qcl-Type1 and qcl-Type2). Qcl-Type1 or qcl-Type2 provides information relating to the index of a cell in which an RS is configured, an index of a BWP in which an RS is included, an RS providing information relating to a parameter supported in a QCL type according to QCL types, and one of a total of four QCL types. The qcl-Type1 may have one QCL type among "QCL-typeA", "QCL-typeB", or "QCL-typeC" in the total of four QCL types, and qcl-Type2 may have "QCL-typeD". By referring to an activated TCI state of an antenna port transmitting a downlink channel, a terminal may receive and decode a downlink channel, based on an RS referenced in the activated TCI state and a QCL type supported in same.

The disclosure has a CSI framework for indicating, by a base station, measurement and reporting of channel state information (CSI) to a terminal. The CSI framework of the NR system may be configured by at least two elements including resource setting and report setting. The report setting may have an association relationship with resource setting by referring to at least one ID of the resource setting.

In the disclosure, the resource setting may include information related to a reference signal (RS) for measuring channel state information by a terminal. A base station may configure at least one resource settings for a terminal. For example, the base station and the terminal may exchange signaling information described as shown in [Table 3] below to transfer information relating to resource setting.

configuration of resources (resourceType), or a resource set list (csi-RS-ResourceSetList) including at least one resource set. Time domain transmission configuration of resources may be configured to be aperiodic transmission, semi-persistent transmission, or periodic transmission. A resource set list may be a set including resource sets for channel measurement, or a set including resource sets for interference measurement. In case that a resource set list is a set including resource sets for channel measurement, each resource set may include at least one resource, and the at least one resource may correspond to an index of a CSI reference signal (CSI-RS) resource or a synchronization/broadcast channel block (SS/PBCH block, SSB). In case that a resource set list is a set including resource sets for interference measurement, each resource set may include at least one interference measurement resource (CSI interfer-

TABLE 3

| CSI-ResourceConfig information element |
|---|

```
-- ASN1START
-- TAG-CSI-RESOURCECONFIG-START
CSI-ResourceConfig ::=          SEQUENCE {
   csi-ResourceConfigId            CSI-ResourceConfigId,
   csi-RS-ResourceSetList          CHOICE {
      nzp-CSI-RS-SSB                 SEQUENCE {
            nzp-CSI-RS-ResourceSetList      SEQUENCE   (SIZE   (1..maxNrofNZP-CSI-RS-
ResourceSetsPerConfig)) OF NZP-CSI-RS-ResourceSetId
OPTIONAL, -- Need R
            csi-SSB-ResourceSetList          SEQUENCE (SIZE (1..maxNrofCSI-SSB-ResourceSetsPerConfig))
OF CSI-SSB-ResourceSetId
OPTIONAL   -- Need R
      },
      csi-IM-ResourceSetList          SEQUENCE (SIZE (1..maxNrofCSI-IM-ResourceSetsPerConfig)) OF
CSI-IM-ResourceSetId
   },
   bwp-Id                         BWP-Id,
   resourceType                   ENUMERATED { aperiodic, semiPersistent, periodic },
   ...
}
-- TAG-CSI-RESOURCECONFIG-STOP
-- ASN1STOP
```

The signaling information CSI-ResourceConfig may include information relating to each resource setting. According to the signaling information, each resource setting may include a resource setting index (csi-ResourceConfigId), a BWP index (bwp-ID), time domain transmission ence measurement, CSI-IM). For example, if a resource set includes a CSI-RS, a base station and a terminal may exchange signaling information described as shown in [Table 4] below to transfer information relating to the resource set.

TABLE 4

| NZP-CSI-RS-ResourceSet information element |
|---|

```
-- ASN1START
-- TAG-NZP-CSI-RS-RESOURCESET-START
NZP-CSI-RS-ResourceSet ::=  SEQUENCE {
   nzp-CSI-ResourceSetId        NZP-CSI-RS-ResourceSetId,
   nzp-CSI-RS-Resources         SEQUENCE (SIZE (1..maxNrofNZP-CSI-RS-ResourcesPerSet))
OF NZP-CSI-RS-ResourceId,
   repetition                             ENUMERATED  {  on,  off  }
OPTIONAL,   -- Need S
   aperiodicTriggeringOffset                   INTEGER(0..6)
OPTIONAL,   -- Need S
   trs-Info                               ENUMERATED  {true}
OPTIONAL,   -- Need R
   ...
}
```

TABLE 4-continued

| NZP-CSI-RS-ResourceSet information element |
| --- |
| -- TAG-NZP-CSI-RS-RESOURCESET-STOP |
| -- ASN1STOP |

The signaling information NZP-CSI-RS-ResourceSet includes information relating to each resource set. According to the signaling information, each resource set may include at least information relating to a resource set index (nzp-CSI-ResourceSetId) and/or a CSI-RS index (or an identifier) set (nzp-CSI-RS-Resources). Further, each resource set may include a part of information (repetition) relating to a spatial domain transmission filter of a CSI-RS resource, and/or information (trs-Info) relating to whether a CSI-RS resource has a tracking purpose. A CSI-RS may be the most representative reference signal included in a resource set. A base station and a terminal may exchange signaling information described as shown in [Table 5] below to transfer information relating to a CSI-RS resource.

powerControlOffset: a ratio between PDSCH EPRE (Energy Per RE) and CSI-RS EPRE.

powerControlOffsetSS: a ratio between SS/PBCH block EPRE and CSI-RS EPRE.

scramblingID: the scrambling index of a CSI-RS sequence.

periodicity AndOffset: the transmission period and the slot offset of a CSI-RS resource qcl-InfoPeriodicCSI-RS: TCI-state information when a corresponding CSI-RS is a periodic CSI-RS.

"resourceMapping" included in the signaling information NZP-CSI-RS-Resource may indicate resource mapping information of a CSI-RS resource, and the resource mapping information may include resource element (RE) mapping for frequency resources, the number of ports, symbol mapping,

TABLE 5

| NZP-CSI-RS-Resource information element |
| --- |
| -- ASN1START |
| -- TAG-NZP-CSI-RS-RESOURCE-START |
| NZP-CSI-RS-Resource ::=      SEQUENCE { |
|   nzp-CSI-RS-ResourceId          NZP-CSI-RS-ResourceId, |
|   resourceMapping                CSI-RS-ResourceMapping, |
|   powerControlOffset             INTEGER (−8..15), |
|   powerControlOffsetSS               ENUMERATED{db−3,  db0,  db3,  db6} |
| OPTIONAL,   -- Need R |
|   scramblingID                   ScramblingId, |
|   periodicityAndOffset          CSI-ResourcePeriodicityAndOffset      OPTIONAL, |
| -- Cond PeriodicOrSemiPersistent |
|   qcl-InfoPeriodicCSI-RS                                  TCI-StateId |
| OPTIONAL,   -- Cond Periodic |
|   ... |
| } |
| -- TAG-NZP-CSI-RS-RESOURCE-STOP |
| -- ASN1STOP |

The signaling information NZP-CSI-RS-Resource includes information relating to each CSI-RS. The information included in the signaling information NZP-CSI-RS-Resource may have meanings as below.

nzp-CSI-RS-ResourceId: the index of a CSI-RS resource.

resourceMapping: resource mapping information of a CSI-RS resource.

CDM type, frequency resource density, and frequency band mapping information. Each of the number of ports, frequency resource density, CDM type, and time-frequency domain RE mapping, which may be configured through the resource mapping information, may have a determined value in one of the rows shown in [Table 6].

TABLE 6

| Row | Ports N | Density $\rho$ | cdm-Type | $(\bar{k}, \bar{l})$ | CDM group index j | k' | l' |
| --- | --- | --- | --- | --- | --- | --- | --- |
| 1 | 1 | 3 | NoCDM | $(k_0, l_0), (k_0 + 4, l_0), (k_0 + 8, l_0)$ | 0, 0, 0 | 0 | 0 |
| 2 | 1 | 1, 0.5 | NoCDM | $(k_0, l_0),$ | 0 | 0 | 0 |
| 3 | 2 | 1, 0.5 | FD-CDM2 | $(k_0, l_0),$ | 0 | 0, 1 | 0 |
| 4 | 4 | 1 | FD-CDM2 | $(k_0, l_0), (k_0 + 2, l_0)$ | 0, 1 | 0, 1 | 0 |
| 5 | 4 | 1 | FD-CDM2 | $(k_0, l_0), (k_0, l_0 + 1)$ | 0, 1 | 0, 1 | 0 |
| 6 | 8 | 1 | FD-CDM2 | $(k_0, l_0), (k_1, l_0), (k_2, l_0), (k_3, l_0)$ | 0, 1, 2, 3 | 0, 1 | 0 |
| 7 | 8 | 1 | FD-CDM2 | $(k_0, l_0), (k_1, l_0), (k_0, l_0 + 1), (k_1, l_0 + 1)$ | 0, 1, 2, 3 | 0, 1 | 0 |

TABLE 6-continued

| Row | Ports N | Density $\rho$ | cdm-Type | $(\bar{k}, \bar{l})$ | CDM group index j | k' | l' |
|---|---|---|---|---|---|---|---|
| 8 | 8 | 1 | CDM 4 (FD2, TD2) | $(k_0, l_0), (k_1, l_0)$ | 0, 1 | 0, 1 | 0, 1 |
| 9 | 12 | 1 | FD-CDM2 | $(k_0, l_0), (k_1, l_0), (k_2, l_0),$ $(k_3, l_0), (k_4, l_0), (k_5, l_0)$ | 0, 1, 2, 3, 4, 5 | 0, 1 | 0 |
| 10 | 12 | 1 | CDM 4 (FD2, TD2) | $(k_0, l_0), (k_1, l_0), (k_2, l_0)$ | 0, 1, 2 | 0, 1 | 0, |
| 11 | 16 | 1, 0.5 | FD-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1)$ | 0, 1, 2, 3, 4, 5, 6, 7 | 0, 1 | 0 |
| 12 | 16 | 1, 0.5 | CDM 4 (FD2, TD2) | $(k_0, l_0), (k_1, l_0), (k_2, l_0), (k_3, l_0)$ | 0, 1, 2, 3 | 0, 1 | 0, 1 |
| 13 | 24 | 1, 0.5 | FD-CDM2 | $(k_0, l_0), (k_1, l_0), (k_2, l_0), (k_0, l_0 + 1),$ $(k_1, l_0 + 1), (k_2, l_0 + 1), (k_0, l_1),$ $(k_1, l_1), (k_2, l_1), (k_0, l_1 + 1), (k_1, l_1 +$ $1), (k_2, l_1 + 1)$ | 0, 1, 2, 3, 4, 5, 6, 7, 8, 9, 10, 11 | 0, 1 | 0 |
| 14 | 24 | 1, 0.5 | CDM 4 (FD2, TD2) | $(k_0, l_0), (k_1, l_0), (k_2, l_0), (k_0, l_1),$ $(k_1, l_1), (k_2, l_1)$ | 0, 1, 2, 3, 4, 5 | 0, 1 | 0, 1 |
| 15 | 24 | 1, 0.5 | CDM 8 (FD2, TD4) | $(k_0, l_0), (k_1, l_0), (k_2, l_0)$ | 0, 1, 2 | 0, 1 | 0, 1, 2, 3 |
| 16 | 32 | 1, 0.5 | FD-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1), (k_0, l_1),$ $(k_1, l_1), (k_2, l_1), (k_3, l_1), (k_0, l_1 + 1),$ $(k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | CDM 4 (FD2, TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM 8 (FD2, TD4) | $(k_0, l_0), (k_1, l_0), (k_2, l_0), (k_3, l_0)$ | 0, 1, 2, 3 | 0, 1 | 0, 1, 2, 3 |

35

[Table 6] shows a frequency resource density configurable according to the number (X) of CSI-RS ports, a CDM type, frequency and time domain starting positions $(\bar{k}, \bar{l})$ of a CSI-RS component RE pattern, and the number (k') of frequency domain REs and the number (l') of time domain REs of a CSI-RS component RE pattern. A CSI-RS component RE pattern described above may be a basic unit for configuring a CSI-RS resource. A CSI-RS component RE pattern may be configured by YZ number of REs through Y=1+max(k') number of frequency domain REs and Z=1+ max(l') number of time domain REs. If the number of CSI-RS ports is 1, the position of a CSI-RS RE may be designated in a physical resource block (PRB) without restriction on subcarriers, and may be designated by a bitmap having 12 bits. If the number of CSI-RS ports is {2, 4, 8, 12, 16, 24, 32}, and Y is equal to 2, the position of a CSI-RS RE may be designated at every two subcarriers in a PRB, and may be designated by a bitmap having 6 bits. If the number of CSI-RS ports is 4, and Y is equal to 4, the position of a CSI-RS RE may be designated at every four subcarriers in a PRB, and may be designated by a bitmap having 3 bits. Similarly, the position of a time domain RE may be designated by a bitmap having a total of 14 bits. According to a Z value shown in [Table 6], the length of a bitmap can be changed like a frequency position designation. However, the principle of the change is similar to the description above, and therefore, a duplicate description will be omitted hereinafter.

Figure 2:
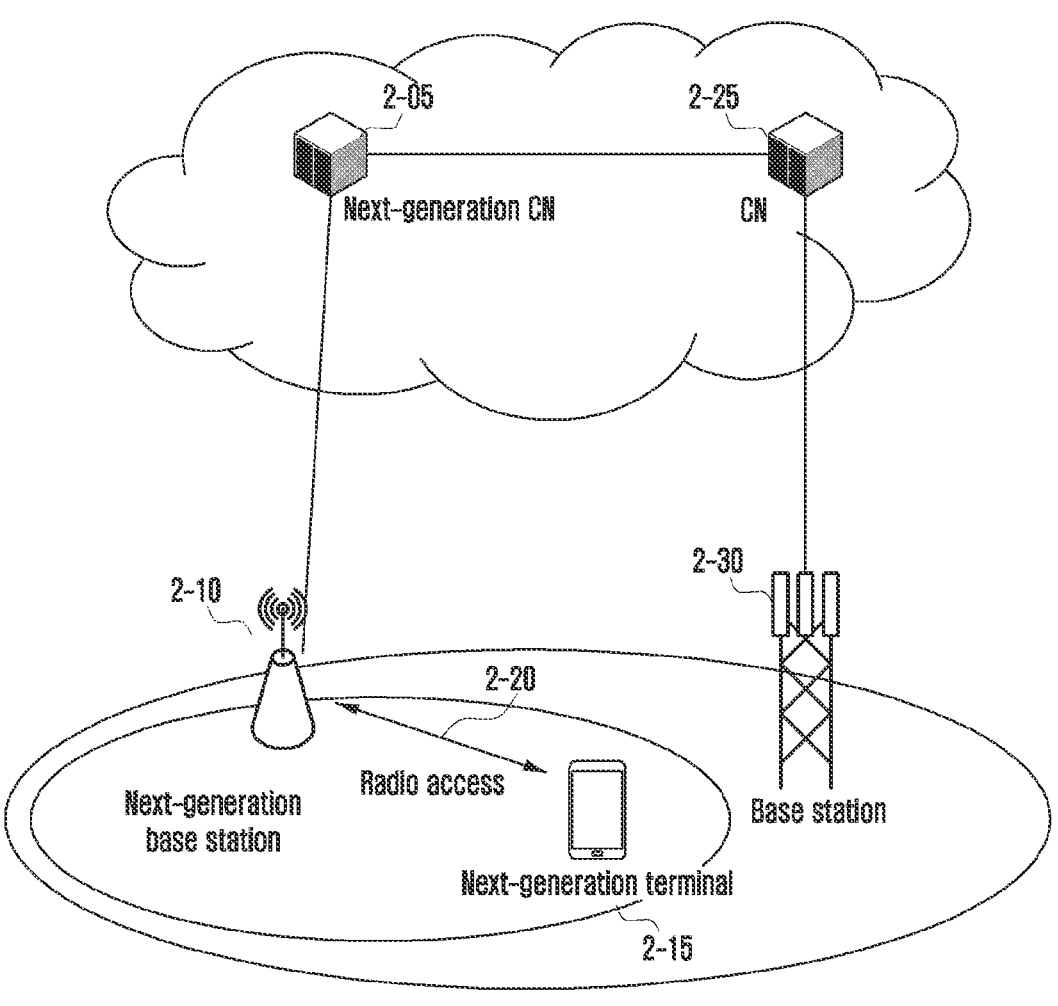
FIG. 2 illustrates the structure of a next-generation wireless communication system according to the disclosure.

FIG. 2 illustrates the structure of a next-generation wireless communication system according to the disclosure.

Referring to FIG. 2, as shown in the drawing, a next-generation wireless communication system to which the disclosure is applicable may include a next-generation base station 2-10 and a next-generation core network (CN) 2-05. The terminal 2-15 may access an external network through the next-generation base station 2-10 and the next-generation CN 2-05.

In FIG. 2, the next-generation base station 2-10 may correspond to an evolved Node B (eNB) of the conventional LTE system or perform a role corresponding to an NR base station (gNB) of the NR system described in FIG. 1. Alternatively, in embodiments of the disclosure, the next-generation base station 2-10 may refer to an LTE eNB or an NR gNB. The next-generation base station 2-10 may be connected to the terminal 2-15 through a wireless channel and provide a communication service superior to that of the conventional Node B. In the next-generation wireless communication system, since user traffic is served through a shared channel, a device for collecting and scheduling status information of buffer statuses, available transmission power statuses, and channel statuses of UEs is required, and the next-generation gNB 2-10 may perform the above-described function. One next-generation gNB 2-10 generally controls a plurality of cells. In order to implement super-high-speed data transmission compared to the conventional wireless communication system, the next-generation system 2-10 may provide a service based on a bandwidth equal to or wider than the conventional maximum bandwidth, and may use newly adopted radio access technology or radio access technology based on orthogonal frequency division multiplexing (OFDM). Further, a modulation scheme and an adaptive modulation and coding (AMC) scheme of determining a channel coding rate may be used in accordance with a channel status of the UE. The next-generation CN 2-05 may perform a function of supporting mobility, configuring a bearer, configuring a QoS, and the like. The next-generation CN 2-05 is a device for performing a function of managing the mobility of the UE 2-15 and various control functions, and may be connected to a plurality of base stations. Further, the next-generation wireless communication system to which the disclosure is applicable may be linked to the conventional LTE system or NR system, and when interworking with the LTE system, the next-generation CN may be connected to a mobility management entity (MME) 2-25 through a network interface. The MME may be connected to an eNB 2-30 which is the conventional LTE base station. Alternatively, when interworking with the NR system, the next-generation CN may be connected to the NR core network 2-25 through a network interface. The NR core network 2-25 may be connected to an NR gNB 2-30. Meanwhile, in the next-generation wireless communication system according to the disclosure, signaling information identical to or similar to the signaling information of [Table 1] to [Table 6] described with reference to FIG. 1 may be configured in the terminal.

Meanwhile, in the above-described next-generation wireless communication system, a system in which one base station including a plurality of transmission reception points (TRPs) capable of transmitting or receiving supports a large physical area may be implemented in order to improve latency due to frequent terminal information exchange and to efficiently utilize radio resources. For example, the implemented system may include a distributed antenna system (DAS) which transmits or receives the same signal by implementing different TRPs in one base station with a physical antenna, a remote radio head system (RRH system) implementing different TRP's in one base station with a structure including an antenna and a radio frequency (RF) terminal and capable of transmitting or receiving different signals, or a coordinated multi-point transmission/reception system (COMP system) which allows different TRPs in one or a plurality of base stations to simultaneously synchronize and transmit and receive the same information to one terminal (or user) (coherent), or each TRP to independently transmit/receive information to/from a terminal (non-coherent).

On the other hand, with the advent of various and numerous connected devices such as smartphones, user data usage is increasing exponentially, and the demand for such data usage has increased even more. To this end, in a next-generation wireless communication system to which the disclosure can be applied, a method for transmitting a signal by using a wider frequency band than that of a conventional wireless communication system is being considered. For example, a method of increasing a signal transmission rate using a 28 GHz band, a 60 GHz band, a terahertz (THz) band, or a higher frequency band than thereof is being considered. However, since the degree of signal attenuation by distance increases as a higher frequency band is used, when the above-mentioned ultra-high frequency is used as the center frequency, a reduction in the coverage of the base station due to signal attenuation is unavoidable. In order to solve this coverage reduction problem of the base station in a next-generation wireless communication system to which the disclosure can be applied, a method for operating a beamforming technology capable of intensively transmitting signals in a specific direction when a base station and a terminal transmit/receive signals, thereby amplifying the strength of the transmitted/received signal.

A beamforming technology that can be considered in a next-generation wireless communication system to which the disclosure is applicable may be summarized as follows.

A. Analog beamforming
Analog beamforming is a method for transmitting different transmission powers and phases using multiple array antennas and overlapping antenna radiation patterns to physically form a beam having directivity in a specific direction and obtaining antenna gain.
A beam can be configured in a desired direction from multiple antennas without channel information of a desired target receiver, and only transmission/reception in one direction at a time is possible. (That is, radiation patterns in other directions may be canceled.)
In case of using multiple antennas, a beam which has high linearity and thus reaches farther with the same power and high antenna gain can be formed. (That is, beam forming may be performed by differentially varying the beam width or length according to the number of antennas.)
A beam formed according to the analog beamforming method has a long length, whereas it may support only a narrow area.

B. Digital Beamforming
Digital beamforming is a method for forming multiple orthogonal beams that cancel desired inter-channel interference by applying different coding for each antenna to information before transmission, by utilizing multi-channel information between antennas having different intensities in a multi-antenna transmission/reception environment.
By applying pre-coding to data transmitted through each antenna, different channel characteristics can be maximally utilized.
Support for single-user MIMO and multi-user MIMO is possible.

C. Hybrid Beamforming
Hybrid beamforming is a method that uses analog beamforming and digital beamforming at the same time.
This is a method of using digital beamforming by using different pre-coding techniques for each antenna with regard to transmission antennas and beams formed by the analog beamforming method.

D. Newly Introduced Beamforming
In addition to the analog beamforming, digital beamforming, and hybrid beamforming methods described above, a combination thereof or a new beamforming method may be introduced in a next-generation wireless communication system to which the disclosure can be applied. In this case, the terminal and the base station may transmit or receive signals according to a beam formed based on the newly introduced beamforming method.
In the disclosure, the beamforming technique may refer to at least one of the analog beamforming, digital beamforming, and hybrid beamforming, or a technique using a beam formed by a newly introduced beamforming method and beamforming, and may refer to a method of occupying and transmitting a resource that can be physically distinguished or distinguishable by frequency, time, code, or the like for transmission of a signal (or data and information). In this case, the embodiments of the disclosure are applicable to all communication systems in which the corresponding occupied resource is referred to as a beam. A system structure in which a terminal and a base station transmit or receive signals based on the above-described beamforming technology will be described in detail with reference to FIG. 3.

Figure 3:
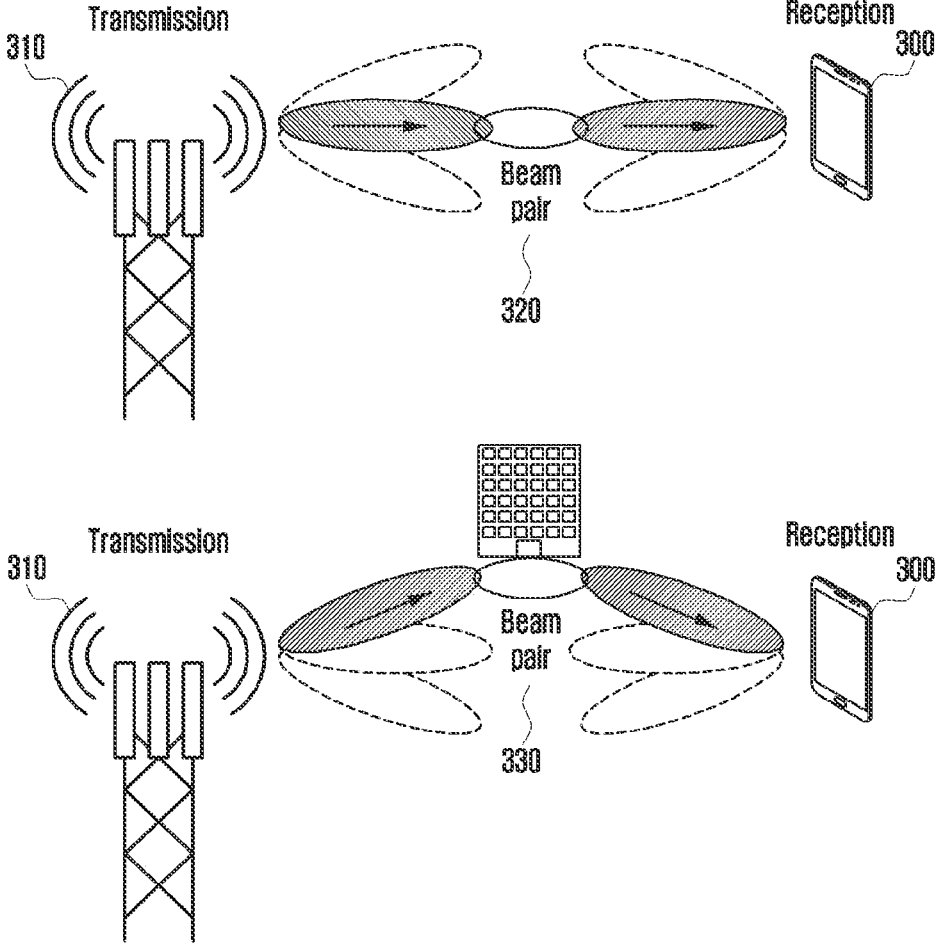
FIG. 3 illustrates the structure of a system in which a terminal and a base station transmit or receive signals based on a beamforming technology in a next-generation wireless communication system according to the disclosure.

FIG. 3 illustrates a structure of a system in which a terminal and a base station transmit or receive signals based on a beamforming technology in a next-generation wireless communication system according to the disclosure.

Referring to FIG. 3, FIG. 3 illustrates a system in which, in order to increase the efficiency of a beamforming technology, not only transmission beam of a transmitter (in the case of downlink, the transmitter may correspond to a base station according to the disclosure, and in the case of uplink, the transmitter may correspond to a terminal according to the disclosure) but also reception beam of a receiver (in the case of downlink, the receiver may correspond to a terminal according to the disclosure, and in the case of uplink, the receiver may correspond to a base station according to the disclosure) are used. In this case, the direction of the transmission beam and the direction of the reception beam should be synchronized (or aligned) with each other to obtain the effect of amplifying the signal strength through the beamforming technology. Although the terminal is located in the direction of the transmission beam of the base station, when the direction of the reception beam of the terminal is not synchronized with the direction of the transmission beam (misalignment), the terminal may not properly receive a signal transmitted through the transmission beam from the base station and thus the received signal strength may be weak. Therefore, in order for the terminal and the base station to transmit and receive signals more efficiently based on the beamforming technology using the transmission beam and the receive beam, the directions of the transmission beam and the reception beam are synchronized with each other (indicated by reference numeral 320), or when the direct path between the base station and the terminal is blocked by an obstacle in the surrounding environment, it is necessary to perform beam management to determine and maintain transmission/reception beam pairs 330 that are not perfectly synchronized but have best performance depending on the reflection path. If such beam management can be efficiently operated, the effect of increasing data transmission rate and throughput can be obtained. On the other hand, the above-described beam management may be distinguished according to a case in which the terminal performs an initial access procedure or a case in which the terminal and the base station has established a connection, and each case will be described in detail below.

First, when the terminal performs an initial access procedure, beam management may refer to a procedure of determining an initial beam pair. The base station may transmit a synchronization signal block (SS/PBCH block, or SSB) corresponding to each transmission beam by using different downlink transmission beams in the initial access procedure of the terminal. The terminal may measure an SSB corresponding to each downlink transmission beam of the base station by alternating its own reception beam, and select the best beam based on the measurement result. Thereafter, the terminal may transmit a random access preamble to the base station based on information on a preamble and a physical random access channel occasion (PRACH occasion) corresponding to the selected best beam. The base station may identify the best beam based on the physical random access channel (PRACH) occurrence by which the random access preamble is transmitted and, based on the identified best beam, the base station may transmit a random access response (RAR) to the terminal so as to perform a procedure of determining an initial beam pair.

Meanwhile, even after the initial transmission/reception beam pair (initial best beam or initial best beam pair) used for signal transmission/reception between a terminal and a base station is determined (that is, even after the initial access procedure of the terminal is completed and the connection between the terminal and the base station is established), in case that the best beam at a corresponding time point due to movement or rotation of the terminal is required to be identified, beam management may be performed. Alternatively, although the terminal is fixed, in case that the channel state for a predetermined beam pair changes as another object in the surrounding moves to shield a beam or a shielded beam is received, the best beam at a corresponding time point is required to be identified and thus beam management can be performed. In this regard, beam management may be referred to as beam adjustment (or beam refinement). Meanwhile, the beam adjustment may include beam adjustment performed by the downlink transmission side and beam adjustment performed by the downlink reception side. Hereinafter, beam adjustment according to the disclosure will be described in detail with reference to FIGS. 4A to 4B.

Figure 4A:
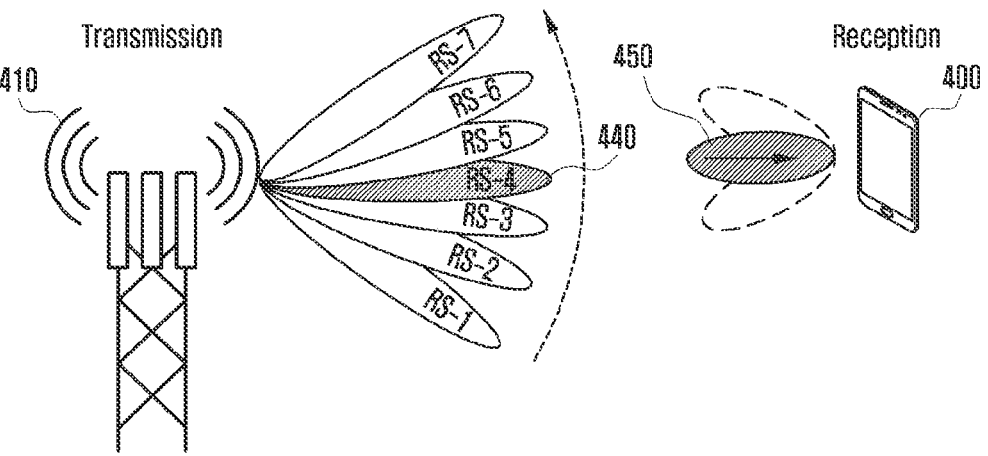
FIG. 4A illustrates a process in which a terminal and a base station perform downlink transmission beam adjustment according to the disclosure.

FIG. 4A illustrates a process in which a terminal and a base station perform downlink transmission beam adjustment according to the disclosure.

Referring to FIG. 4A, in the case of beam adjustment performed by a downlink transmission side, a reception beam 450 of a terminal 400 may be maintained and a transmission beam of a base station 410 may be adjusted. To this end, the base station 410 may transmit signals by using different transmission beams alternately and sequentially or randomly. Meanwhile, in the disclosure, transmitting (or receiving) a signal using different beams (transmission beam or reception beam) alternately and sequentially or randomly may be referred to as beam sweeping. The terminal 400 may measure a reference signal (RS) corresponding to different transmission beams transmitted from the base station while maintaining the reception beam. In this case, the reference signal may correspond to a channel state information-reference signal (CSI-RS) or SSB. Based on the reference signal, the terminal 400 may measure the quality of each of the different transmission beams (e.g., the strength of a reference signal (e.g., RSRP) received through the transmission beam, or the channel quality of the transmission beam). Thereafter, the terminal 400 may transmit a channel state information (CSI) report including a result of measurement for different transmission beams to the base station 410, and here, the result of measurement for the different transmission beams may include information on the best beam 440 or information on the top-ranked N beams in terms of performance. Meanwhile, the information on the best beam may include at least one index among an index of a best transmission beam, an index of a best reception beam, or an index of each best transmission/reception beam, and may include channel quality information (CQI) about the best beam. In addition, the information on the top-ranked N beams in terms of performance may imply information about N beams having top-ranked signal strengths or channel qualities in a descending order based on a result obtained by measuring the signal strengths or channel qualities of different transmission beams. In this case, N may be predetermined, may be configured through a higher-level message such as an RRC message, and may be indicated by control information transmitted from the base station.

On the other hand, when CSI-RS is used as a reference signal corresponding to different transmission beams transmitted from the base station, the base station may determine a beam corresponding to the CSI-RS according to various embodiments of the disclosure to be described later, and may use the CSI-RS for the beam adjustment.

Figure 4B:
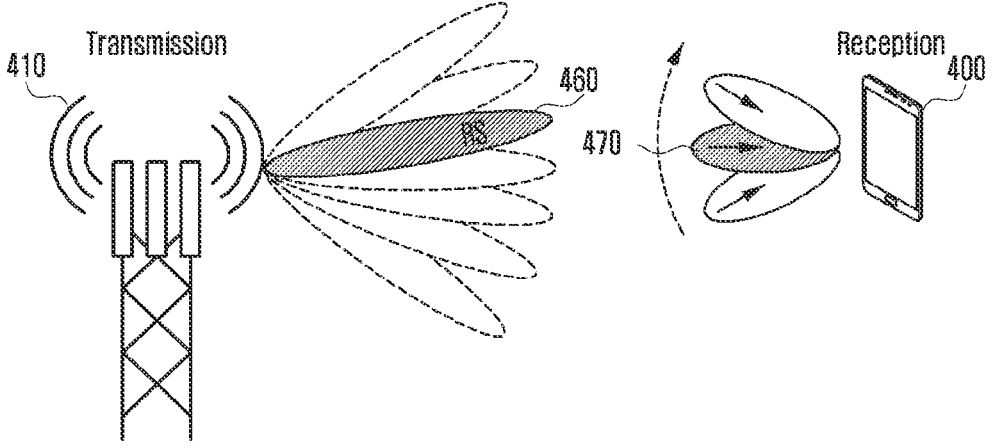
FIG. 4B illustrates a process in which a terminal and a base station perform downlink reception beam adjustment according to the disclosure.

FIG. 4B illustrates a process in which a terminal and a base station perform downlink reception beam adjustment according to the disclosure.

Referring to FIG. 4B, in the case of beam adjustment performed by a downlink reception side, a base station 410 may maintain a transmission beam, and a terminal 400 may adjust (or sweep) a reception beam. To this end, the base station 410 may configure a set of downlink RSs 460 in the terminal 400, and the terminal 400 may measure the RS 460 by sequentially applying a reception beam to the configured RS 460. The terminal 400 may identify a best beam 470 based on the measurement result of the RS 460. Meanwhile, in the disclosure, downlink has been described as an example, but this is only for convenience of explanation, and when uplink beam adjustment is required, the above-described downlink beam adjustment procedure may be similarly applied.

Meanwhile, when a beam is changed as a result of performing the above-described beam management, the base station needs to notify the terminal of information about the beam change as a result of the beam management. In the disclosure, this may be referred to as a beam indication, and will be described in detail with reference to FIG. 5.

Figure 5:
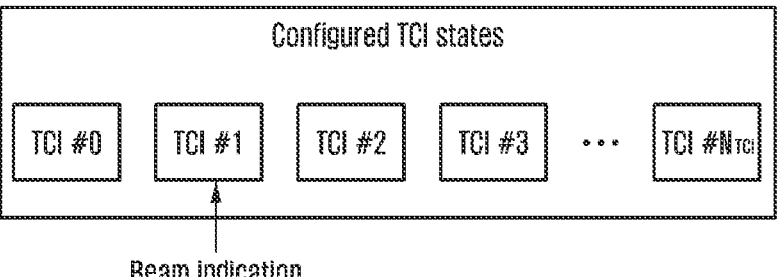
FIG. 5 illustrates a beam indication method in a next-generation wireless communication system according to the disclosure.

FIG. 5 illustrates a beam indication method in a next-generation wireless communication system according to the disclosure.

Referring to FIG. 5, in the next-generation wireless communication system according to the disclosure, when the best beam is changed as a result of beam management, a base station may perform a beam indication notifying a terminal of information about the beam change (or beam switching)

The aforementioned beam indication may be understood as providing an indication, to the terminal, that a physical downlink shared channel (PDSCH) or a physical downlink control channel (PDCCH) is being transmitted using the same beam as that of an RS (e.g., CSI-RS or SSB) configured in the terminal. Alternatively, the beam indication may be understood as indicating that the PDSCH or PDCCH is transmitted using the same spatial filter as that of the configured RS. Meanwhile, in the disclosure, transmitting or receiving the PDSCH may be understood as transmitting or receiving data through the PDSCH, and transmitting or receiving the PDCCH may be understood as transmitting or receiving DCI through the PDCCH.

Meanwhile, the beam indication method according to the disclosure may be performed through downlink signaling using transmission configuration indicator state (TCI state) information.

The base station may notify the terminal of information about a beam related to downlink transmission (PDSCH or PDCCH transmission) through TCI state information. The UE may assume that the PDSCH or PDCCH and an RS (e.g., CSI-RS or SSB) included in the TCI state information are transmitted through the same downlink transmission beam. That is, the base station may include information on the CSI-RS and information on the SSB in the TCI state information and notify the terminal that the PDSCH or PDCCH is transmitted through the same transmission beam as that of the CSI-RS or SSB.

Specifically, the base station may configure N (e.g., a maximum of 128) TCI states for the terminal. The N TCI states may be included in an information element (IE) (e.g., PDSCH-Config) in a higher-level message such as an RRC message (e.g., RRC Reconfiguration message) transmitted by the base station to the terminal. In addition, the base station may configure M (e.g., up to 64) candidate TCI states used to indicate (or specify) a beam through which the PDCCH is transmitted among the N TCI states through the higher-level message. In the list of candidate TCI states, a configuration for each TCI state may be as shown in Table 7 below. The relationship between the QCL configuration and the TCI state according to each TCI state configuration is as described above.

TABLE 7

```
-- ASN1START
-- TAG-TCI-STATE-START
TCI-State ::=              SEQUENCE {
    tci-StateId               TCI-StateId,
    qcl-Type1                 QCL-Info,
    qcl-Type2                 QCL-Info         OPTIONAL,    -- Need R
    ...
}
QCL-Info ::=              SEQUENCE {
    cell                      ServCellIndex    OPTIONAL,    -- Need R
    bwp-Id                    BWP-Id                        OPTIONAL,-- Cond
    CSI-RS-Indicated
    referenceSignal           CHOICE {
        csi-rs                    NZP-CSI-RS-ResourceId,
        ssb                       SSB-Index
    },
    qcl-Type                  ENUMERATED {typeA, typeB, typeC, typeD},
    ...
}
-- TAG-TCI-STATE-STOP
-- ASN1STOP
...
maxNrofTCI-StatesPDCCH    INTEGER ::= 64
maxNrofTCI-States         INTEGER ::= 128 --Maximum number of TCI
states
...
NZP-CSI-RS-Resource ::=   SEQUENCE {
    nzp-CSI-RS-ResourceId     NZP-CSI-RS-ResourceId,
    resourceMapping           CSI-RS-ResourceMapping,
    powerControlOffset        INTEGER (-8..15),
    powerControlOffsetSS          ENUMERATED{db-3, db0, db3, db6}
```

TABLE 7-continued

```
OPTIONAL,   -- Need R
    scramblingID              ScramblingId,
    periodicityAndOffset           CSI-ResourcePeriodicityAndOffset
OPTIONAL,   -- Cond PeriodicOrSemiPersistent
    qcl-InfoPeriodicCSI-RS           TCI-StateId
OPTIONAL,   -- Cond Periodic
    ...
}
-- TAG-NZP-CSI-RS-RESOURCE-STOP
-- ASN1STOP
```

The base station may transmit configuration information for the candidate TCI state to the terminal through a higher-level message such as an RRC message, and the terminal may store the configuration information for the candidate TCI state. In this case, the configuration information may include information as shown in [Table 8] and [Table 9] below, and the configuration information may be transmitted to the terminal through a higher-level message in the form of a log.

TABLE 8

|  | tci-StateID | referenceSignal index |
| --- | --- | --- |
| TCI-State (SSB) | 0 | 12 (SSB) |
|  | 1 | 32 (SSB) |
|  | 2 | 52 (SSB) |
|  | 3 | 13 (SSB) |

TABLE 9

|  | tci-StateID | nzp-CSI-RS-ResourceID |
| --- | --- | --- |
| TCI-State (CSI-RS) | 0 | 1 |
|  | 0 | 2 |
|  | 1 | 3 |
|  | 1 | 4 |
|  | 2 | 5 |
|  | 2 | 6 |
|  | 3 | 7 |
|  | 3 | 8 |

Thereafter, when there is a change in beam, the base station may transmit a control message to the terminal through an L1 signal (e.g., downlink control information (DCI)) or an L2 signal (e.g., MAC CE), so as to indicate (or specify) a beam to be changed. For example, the base station may transmit information about the beam switching periodicity and information on the changed beam to the terminal, and thus a beam used for signal transmission/reception between the base station and the terminal may be changed. The terminal may receive the control message from the base station, identify an activated TCI state information in the control message, and identify that the PDCCH is transmitted through the same beam as that of the RS (e.g., CSI-RS or SSB) associated with the activated TCI state (e.g., the terminal may assume that the PDCCH is transmitted through the same spatial filter as that of the RS).

Meanwhile, in the next-generation wireless communication system according to the disclosure, as described above, since signal transmission/reception in a ultra-high frequency band is considered, a change in a beam state according to a change in a surrounding communication environment may be relatively large. Therefore, the best beam should be determined at a corresponding time point and a signal should be transmitted and received according thereto in real time or continuously (background), and thus the beamforming technology can be efficiently operated. In this regard, in the disclosure, performing the above-described beam management in real time or continuously by a terminal or a base station may be referred to as beam tracking, and beam tracking according to the disclosure will be described in detail with reference to FIGS. 6 to 7 below.

Figure 6:
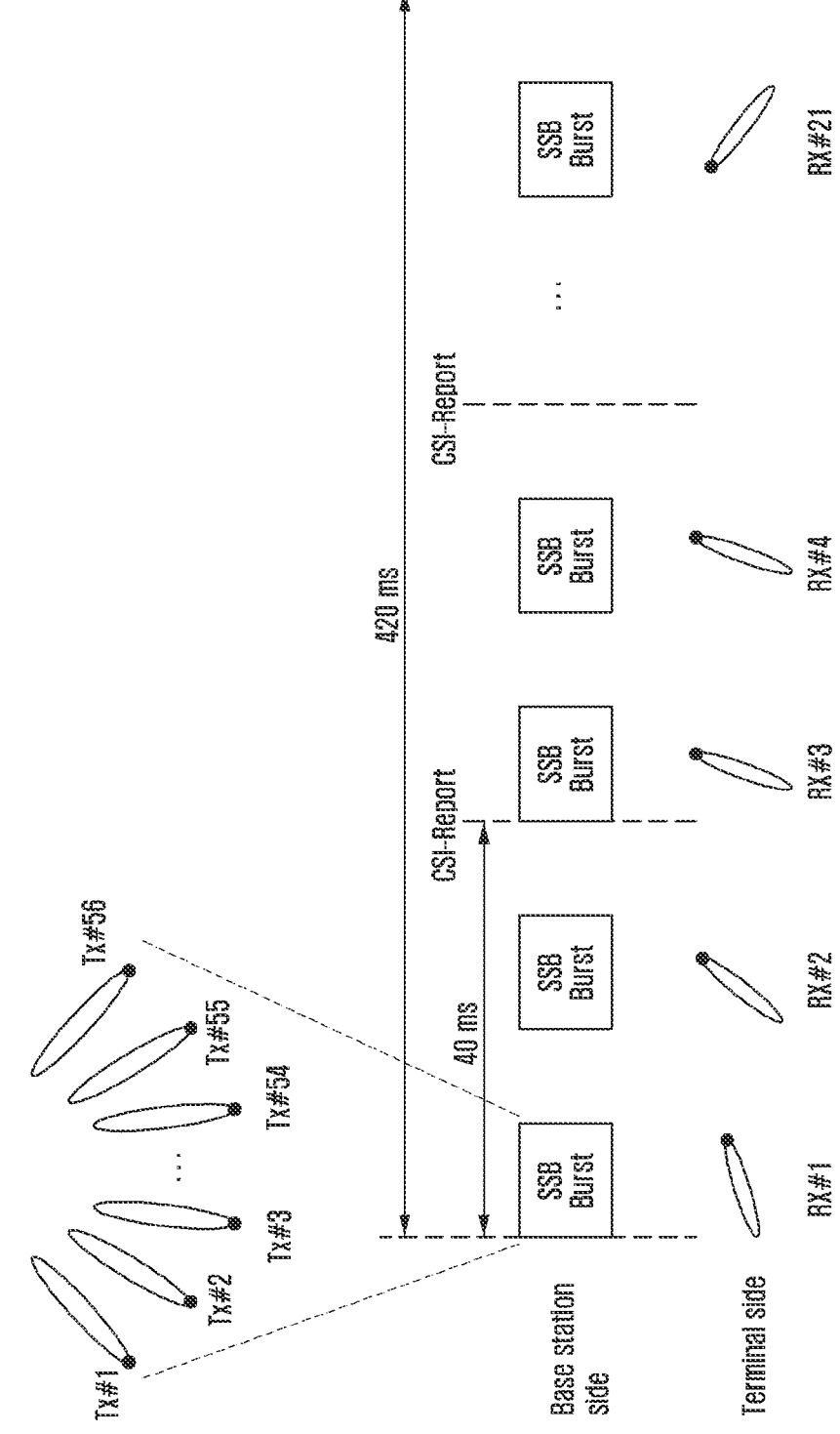
FIG. 6 illustrates a process of performing beam tracking according to an embodiment of the disclosure.

FIG. 6 illustrates a process of performing beam tracking according to an embodiment of the disclosure.

Referring to FIG. 6, a base station may transmit to a terminal an SSB burst including at least one SSB corresponding to each of different downlink transmission beams. The terminal may receive each SSB included in the SSB burst transmitted from the base station while maintaining a reception beam, and measure the channel quality thereof (here, the channel quality may include a channel state, signal strength, etc.). In addition, the terminal may receive its own reception beam for each of the SSB bursts by alternating between sequentially and randomly. The terminal may receive SSBs included in the SSB burst as described above and measure the channel quality thereof. The terminal may store information on each downlink reception/transmission beam pair (e.g., information on a downlink reception beam, information on a downlink transmission beam, a result of measuring the signal strength of the SSB received through the corresponding downlink reception/transmission beam pair, the channel quality of the corresponding downlink reception/transmission beam pair may be included). Here, the terminal may store the aforementioned information on the downlink reception/transmission beam pair in a beam database (DB) in the form of a table as shown in Table 10 below.

TABLE 10

| | | Beam DB | | | | | |
| --- | --- | --- | --- | --- | --- | --- | --- |
| Rx Beam Index(SSB index) | Tx Beam Index(SSB index) | #1 | #2 | #3 | #4 | ... | #56 |
| . | . | . | . | . | . | . | . |
| #1 | . | −70(dBm) | −65 | −80 | −90 | ... | ... |
| #2 | . | −74 | −62 | −85 | −95 | ... | ... |
| #3 | . | −75 | −69 | −78 | −93 | ... | ... |
| #4 | . | −80 | −85 | −87 | −85 | ... | ... |
| ... | . | ... | ... | ... | ... | ... | ... |
| #21 | . | ... | ... | ... | ... | ... | ... |

Thereafter, the terminal may determine the best beam based on the stored information on the downlink transmission/reception beam pair, and may transmit (or report), to the base station, information about the determined best beam (e.g., at least one index among the index of the best transmission beam, the index of the best reception beam, or the index of each best transmission/reception beam may be included, and channel quality information (CQI) for the best beam may be included). For example, when CSI-RS report is triggered (aperiodic CSI-RS report), or when a CSI-RS report is performed every predetermined period (periodic CSI-RS report), the terminal may report the CSI-RS report including information on the best beam to the base station. Meanwhile, for convenience of explanation, FIG. 6 of the disclosure is illustrated by assuming that an SSB burst is transmitted from the base station to the terminal every 20 ms, that the CSI report of the terminal is performed every 40 ms, that the number of reception beams of the terminal is 21, and that the number of transmission beams of the base station is 56. However, this is only an example for convenience of explanation, and the disclosure is not limited thereto. For example, when a signal is transmitted/received in a higher high frequency band, the number of reception beams of the terminal may increase.

Figure 7:
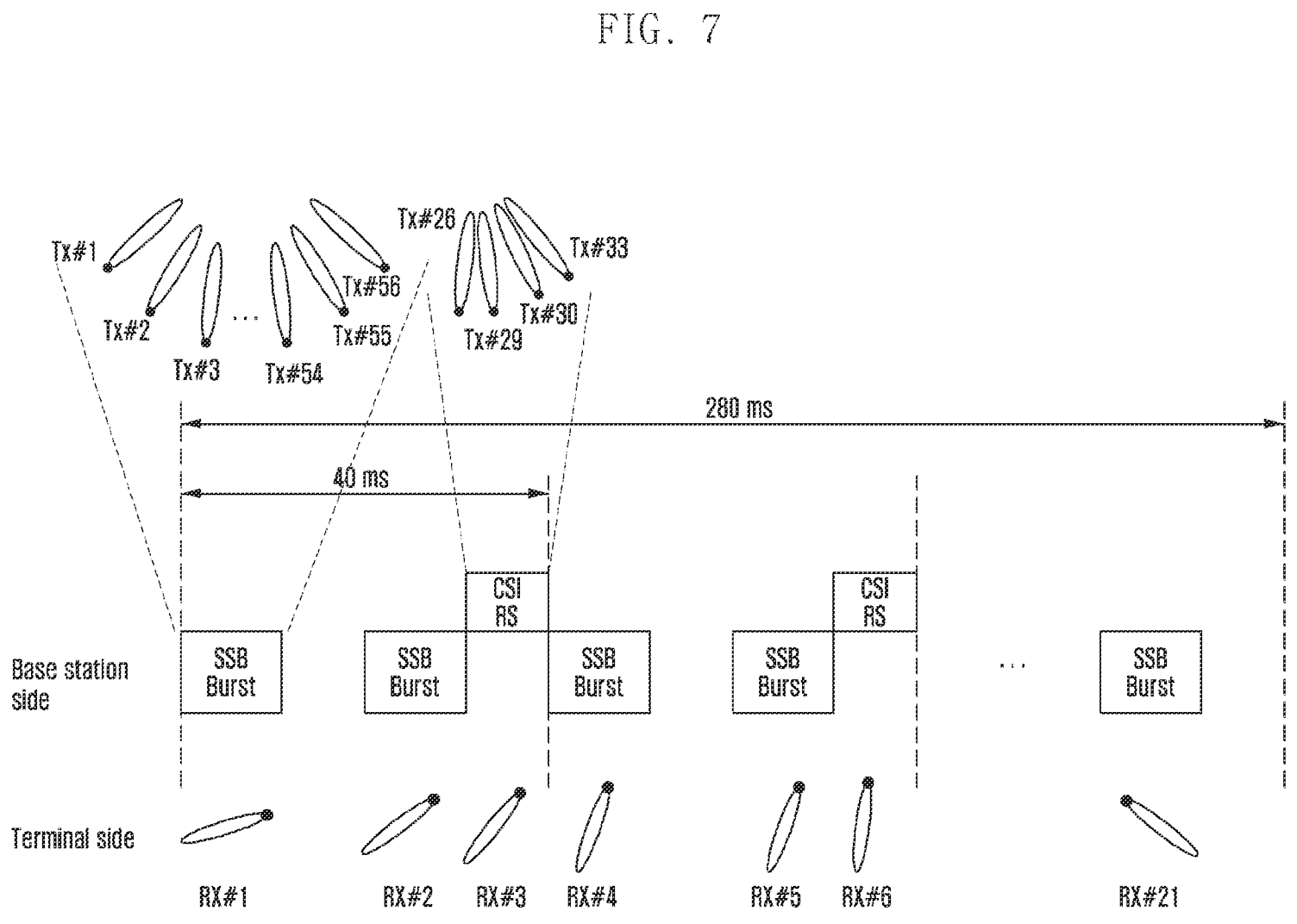

Meanwhile, as shown in FIG. 6, in order for the terminal to measure the SSB transmitted from the base station to perform beam tracking, as described above, the terminal should sequentially or randomly sweep its own reception beam with respect to each of the SSB bursts transmitted by the base station, receive SSBs corresponding to different transmission beams included in the SSB burst while maintaining the reception beam corresponding to each SSB burst, and measure the channel quality thereof. For example, in case that the terminal can generate (form) a plurality of receive beams having n different directing directions, and the base station can generate a plurality of transmission beams having k different directing directions, since the terminal should receive an SSB burst including SSBs corresponding to k transmission beams, respectively, while sequentially or randomly selecting a plurality of n reception beams, information on an actual best beam can be obtained only when channel quality is measured for a total of nXk pairs of transmission beam and reception beam. That is, only when full sweeping of the reception beam of the terminal is performed with respect to the transmission beam of the base station, the information on the actual best beam can be obtained. However, in a system considering signal transmission and reception in a terahertz band or ultra-high frequency band than thereof, such as the next-generation wireless communication system according to the disclosure, the number of the reception beam or the transmission beam of the terminal or the base station increases in order to solve the problem of coverage reduction of the base station, and accordingly, a time during which the full sweeping of the reception beam of the terminal with respect to the transmission beam of the base station is completed may be longer than the CSI reporting period and the beam state may change in a short period of time. In this case, information on a reception beam or a transmission beam, which is no longer the best beam at the time of CSI reporting because the reception or transmission beam measurement has been performed long time ago, may be transmitted to the base station through the CSI report. Accordingly, beam tracking that does not properly reflect a change in the communication environment may be performed, and thus the beam tracking performance may be deteriorated. To solve this problem, the disclosure proposes a beam tracking method using a channel state information-reference signal (CSI-RS) in addition to the beam tracking method described with reference to FIG. 6. A detailed description thereof will be described with reference to FIG. 7. FIG. 7 illustrates a process of performing beam tracking according to an embodiment of the disclosure.

Referring to FIG. 7, a base station may transmit to a terminal an SSB burst including at least one SSB corresponding to each of different downlink transmission beams. The terminal may receive each SSB included in the SSB burst transmitted from the base station while maintaining a reception beam, and measure the channel quality thereof (here, the channel quality may include a channel state, signal strength, etc.). In addition, the terminal can receive its own reception beam for each of the SSB bursts by alternating between sequentially and randomly. The terminal may receive SSBs included in the SSB burst as described above and measure the channel quality thereof. Meanwhile, unlike the beam tracking method described with reference to FIG. 6, the beam tracking method described with reference to FIG. 7 may perform beam tracking on a CSI-RS transmitted by a base station.

Specifically, as described above, the base station may transmit TCI state information to the terminal through a higher-level message such as an RRC message. The terminal may identify information on a CSI-RS corresponding to the SSB (e.g., information on the CSI-RS resource) based on the TCI state information, and may identify a beam corresponding to the CSI-RS based on the information on the CSI-RS. Accordingly, the terminal may receive, while maintaining its own reception beam, a CSI-RS corresponding to at least one of the downlink transmission beams of the base station, and measure the channel quality thereof (here, the channel quality is the channel status, signal strength, etc.). In this case, the reception beam of the terminal may imply a best reception beam identified by referring to a pre-stored beam DB, or beams corresponding to the top-ranked N beams in terms of performance. The terminal may store information on each downlink reception/transmission beam pair (e.g., information on a downlink reception beam, information on a downlink transmission beam, a result of measuring the signal strength of the CSI-RS or SSB received through the corresponding downlink reception/transmission beam pair, the channel quality of the corresponding downlink reception/transmission beam pair may be included). Here, the terminal may store the aforementioned information on the downlink reception/transmission beam pair in a beam database (DB) in the form of a table as shown in [Table 10] described above. Thereafter, the terminal may determine the best beam based on the stored information on the downlink transmission/reception beam pair, and may transmit (or report), to the base station, information about the determined best beam (e.g., at least one index among the index of the best transmission beam, the index of the best reception beam, or the index of each best transmission/reception beam may be included, and channel quality information (CQI) for the best beam may be included). For example, when CSI-RS report is triggered (aperiodic CSI-RS report), or when a CSI-RS report is performed every predetermined period (periodic CSI-RS report), the terminal may report the CSI-RS report including information on the best beam to the base station. Meanwhile, for convenience of explanation, FIG. 7 of the disclosure is illustrated by assuming that an SSB burst is transmitted from the base station to the terminal every 20 ms, that the CSI report of the terminal is performed every 40 ms, that the number of reception beams of the terminal is 21, that the number of transmission beams of the base station is 56, that the indices of beams corresponding to the CSI-RS are 26, 29, 30, and 33, and that the CSI-RS is transmitted just before the CSI reporting timing. However, this is only an example for convenience of explanation, and the disclosure is not limited thereto.

According to the beam tracking method proposed in FIG. 7 of the disclosure, the terminal may additionally perform sweeping of the reception beam with respect to the downlink transmission beam corresponding to the CSI-RS at a timing at which the CSI-RS is transmitted from the base station. Accordingly, it is possible to shorten a time required for full beam sweeping of the reception beam, and thus information on the transmission/reception beam pair may be updated in a shorter period. Therefore, information on the actual best beam may be identified at the CSI reporting time point and the actual best beam information may be reported to the base station, and thus beam tracking with improved performance may be performed.

Meanwhile, the base station having received the CSI report of the terminal may determine whether to change a beam used for signal transmission/reception between the terminal and the base station based on the information about the best beam included in the CSI report. In case that the base station determines to change the beam, the base station may transmit a control message indicating the changed beam to the terminal through an L1 signal (e.g., DCI) or an L2 signal (MAC CE) as described above in FIG. 5, so as to perform beam indication for the changed beam. Meanwhile, in the beam tracking method proposed in the disclosure, the base station may determine a beam corresponding to the CSI-RS based on various methods, and an example thereof will be described with reference to FIG. 8.

Figure 8:
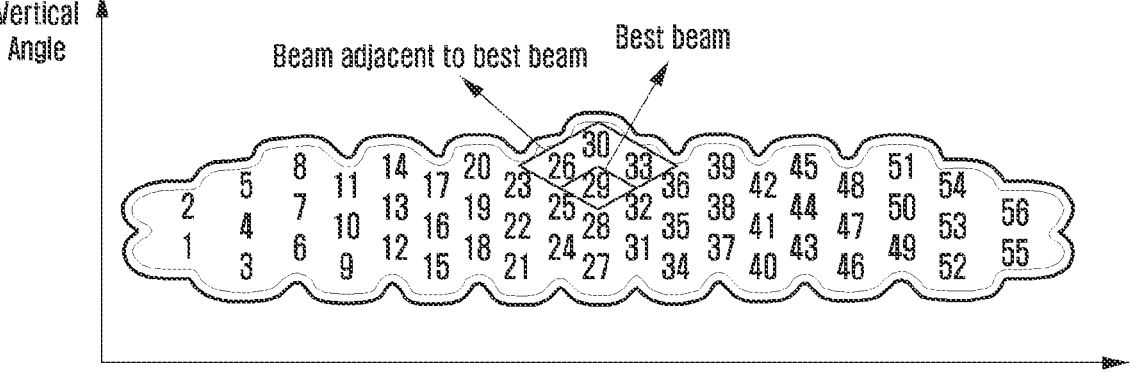
FIG. 8 illustrates an example of determining a beam corresponding to a CSI-RS in beam tracking according to an embodiment of the disclosure.

FIG. 8 illustrates an example of determining a beam corresponding to a CSI-RS in beam tracking according to an embodiment of the disclosure.

In FIG. 8, a case in which a base station receives information that a beam corresponding to a beam index (or SSB index) of 29, which is a beam different from the conventional best beam, is the best beam from the terminal through a CSI report is exemplified. The base station may determine beams (e.g., beams having a beam index of 26, 30, and 33) adjacent to a beam having a beam index of 29 in a beam book as a beam corresponding to the CSI-RS. On the other hand, in the disclosure, the adjacent beam may imply a beam spatially adjacent to the best beam, which is identified based on at least one of a horizontal angle, a vertical angle, or various spatial parameters. In addition, the number of beams corresponding to the CSI-RS may be determined based on the capability of the terminal, etc., and may be randomly determined by the base station. The base station according to the disclosure may determine whether to change the beam corresponding to the CSI-RS based on information about the best beam included in the CSI report. In case that information on a beam different from the conventional best beam is included in the CSI report, the base station may change (or determine) a beam corresponding to the CSI-RS by referring to TCI state information. That is, the base station identify information on the adjacent beam (e.g., SSB index) based on the beam information included in the CSI report, and may identify information on the CSI-RS (e.g., CSI-RS-Resource ID) corresponding to the adjacent beam based on the TCI state information. Thereafter, the base station may transmit (or provide) the CSI-RS, which is identified based on the information on the CSI-RS, to the terminal, so that the beam tracking according to the disclosure may be performed.

On the other hand, in the case of considering signal transmission and reception in a ultra-high frequency band as in the next-generation wireless communication system according to the disclosure, a change in signal attenuation and channel change rate, etc. may rapidly occur according to the direction (or orientation) of the terminal and the movement speed thereof. Therefore, beams selected as the best beam are identical although they are not spatially identical or adjacent, or even when the beams are not the same, the selection tendency of the best beams (e.g., the number of times of being selected as the best beams for each beam index, or a probability distribution thereof, etc.) may be similar. That is, even when beams are spaced apart in terms of location, a beam pattern (this may be referred to as a beam selection pattern, a pattern or probability distribution indicating the probability of being selected as the best beam for each beam index, or a term having the same meaning thereof, and in the disclosure, it will be described as the beam pattern later) may be similar. In addition, in the next-generation wireless communication system according to the disclosure, even in consideration of factors of change in various communication environments, the beams selected as the best beam for each terminal location due to the signal characteristics of the ultra-high frequency band may correspond to a part of the plurality of beams. In this regard, the disclosure proposes a method in which a base station generates (or identifies) a location-specific beam pattern based on the location information of the terminal and information about the best beam at the corresponding location, performs clustering to include beam patterns, which are determined to be the same or similar among the generated beam patterns, in the same cluster (or, it may be referred to as a term having the same or similar meaning, such as a set or a group, which will be described later as a cluster in the disclosure) according to a predetermined criterion, determines a beam corresponding to the CSI-RS based on the clustering result, and then performs beam tracking based on the determination of beam. This will be described with reference to FIG. 9.

Figure 9:
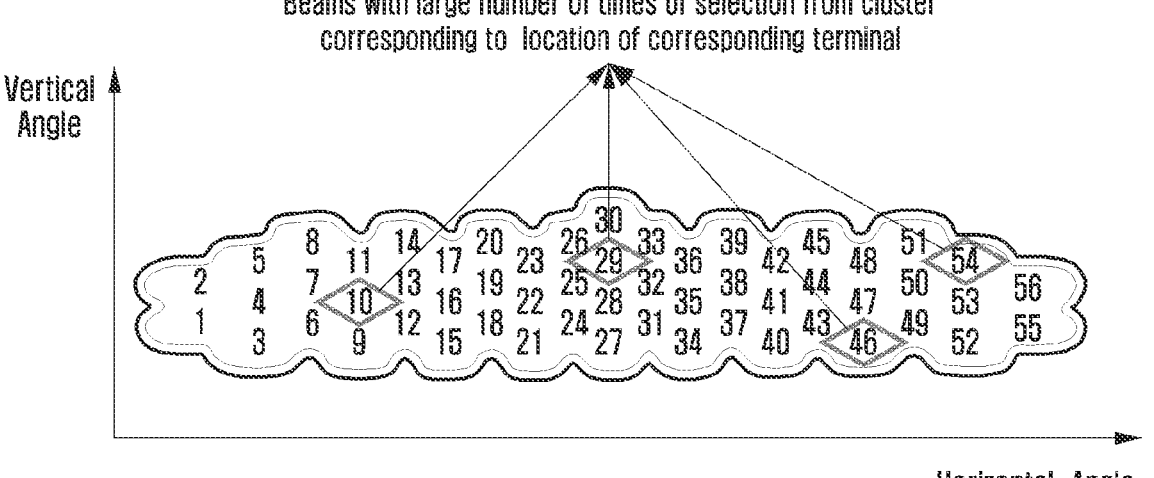
FIG. 9 illustrates an example of determining a beam corresponding to a CSI-RS in beam tracking according to an embodiment of the disclosure.

FIG. 9 illustrates an example of determining a beam corresponding to a CSI-RS in beam tracking according to an embodiment of the disclosure.

Referring to FIG. 9, beams corresponding to a CSI-RS are determined for each location, and the CSI-RS may be transmitted to a terminal through the beams according to the location of the terminal. For example, in case that the number of times that beams corresponding to beam indices 10, 29, 46, and 54 are selected as the best beam in a cluster corresponding to the current location of the terminal is high, the base station may determine beams corresponding to the beam indices 10, 29, 46 and 54 as beams corresponding to the CSI-RS. The base station may identify information (e.g., SSB index) on a beam determined as a beam corresponding to the CSI-RS, and may identify information (e.g., CSI-RS-Resource ID) on the CSI-RS corresponding to the determined beam based on TCI state information. Thereafter, the base station may transmit the CSI-RS identified based on the information on the CSI-RS to the terminal. Meanwhile, the above-described examples are provided for convenience in describing embodiments of the disclosure, and the disclosure is not limited thereto.

Therefore, according to the beam tracking method proposed in the disclosure, beams that are highly likely to be selected as the best beam at the location of the terminal can be transmitted to the terminal in correspondence with the CSI-RS, thereby further improving the performance of beam tracking. In addition, according to the beam tracking method proposed in the disclosure, there is no need to change a beam corresponding to the CSI-RS by reporting location information such as GPS information to the base station every time the location of the terminal changes, only in case that cluster change occurs (e.g., when a terminal has moved and a cluster ID corresponding to the location of the terminal is changed), information about the changed cluster (e.g., the changed cluster ID) is transmitted to the base station, and the base station changes a beam corresponding to the CSI-RS based on the information about the changed cluster, so that signaling load can be effectively reduced. In addition, since the base station may operate the CSI-RS for each cluster, rather than allocating and operating the CSI-RS for each terminal, a more efficient communication system may be built. Hereinafter, the beam tracking method proposed in the disclosure will be described in detail with reference to FIGS. 10A to 19. On the other hand, the beam tracking method proposed in the disclosure may be performed based on the CSI-RS or SSB (SSB burst) transmitted from the base station as described above in FIGS. 6 and 7. However, hereinafter, in order not to obscure the gist of the disclosure, a method of performing beam tracking based on the CSI-RS will be mainly described.

Figure 10A:
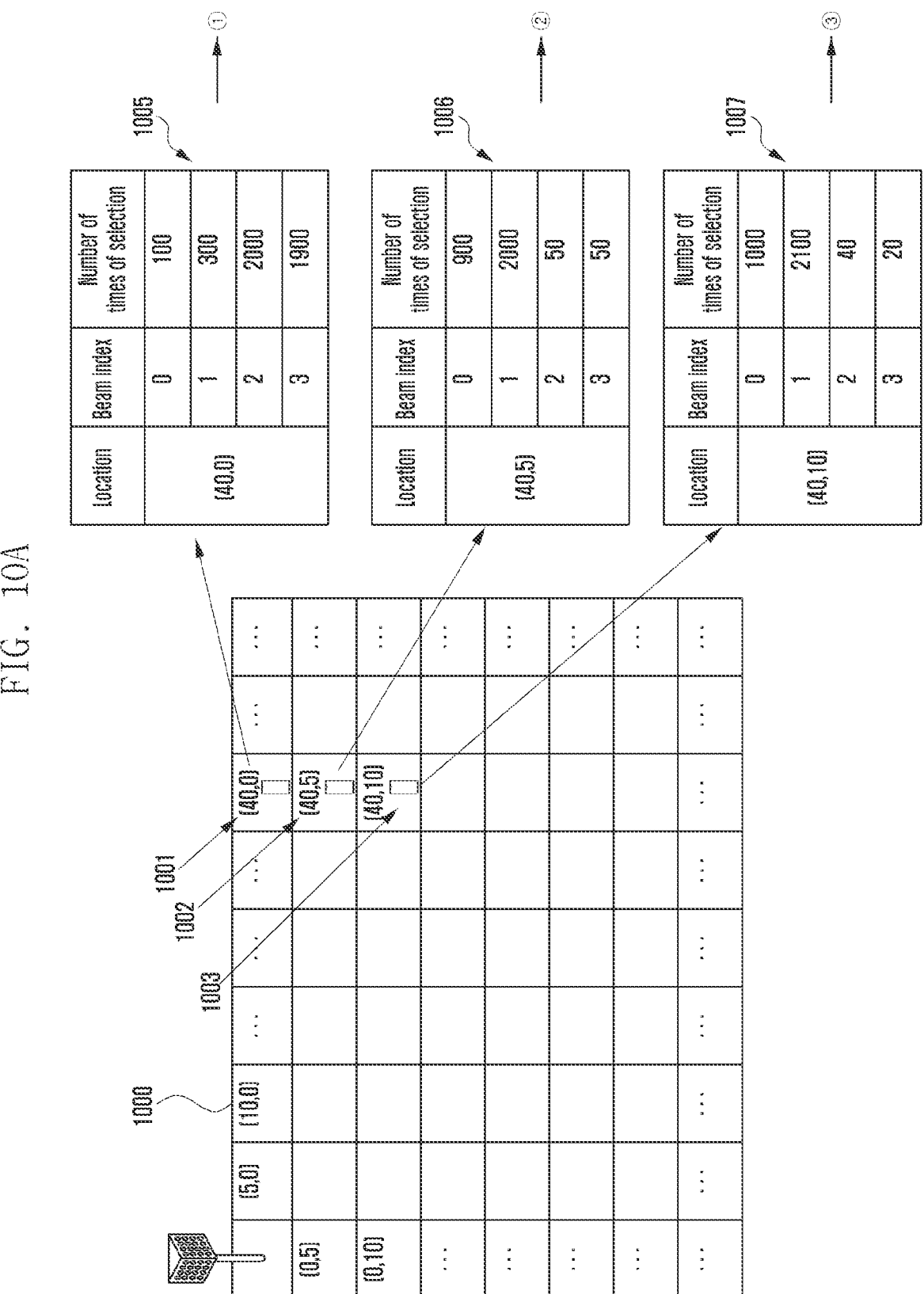
FIG. 10A illustrates an example of a method for clustering a location-specific beam pattern by a base station according to an embodiment of the disclosure.
Figure 10B:
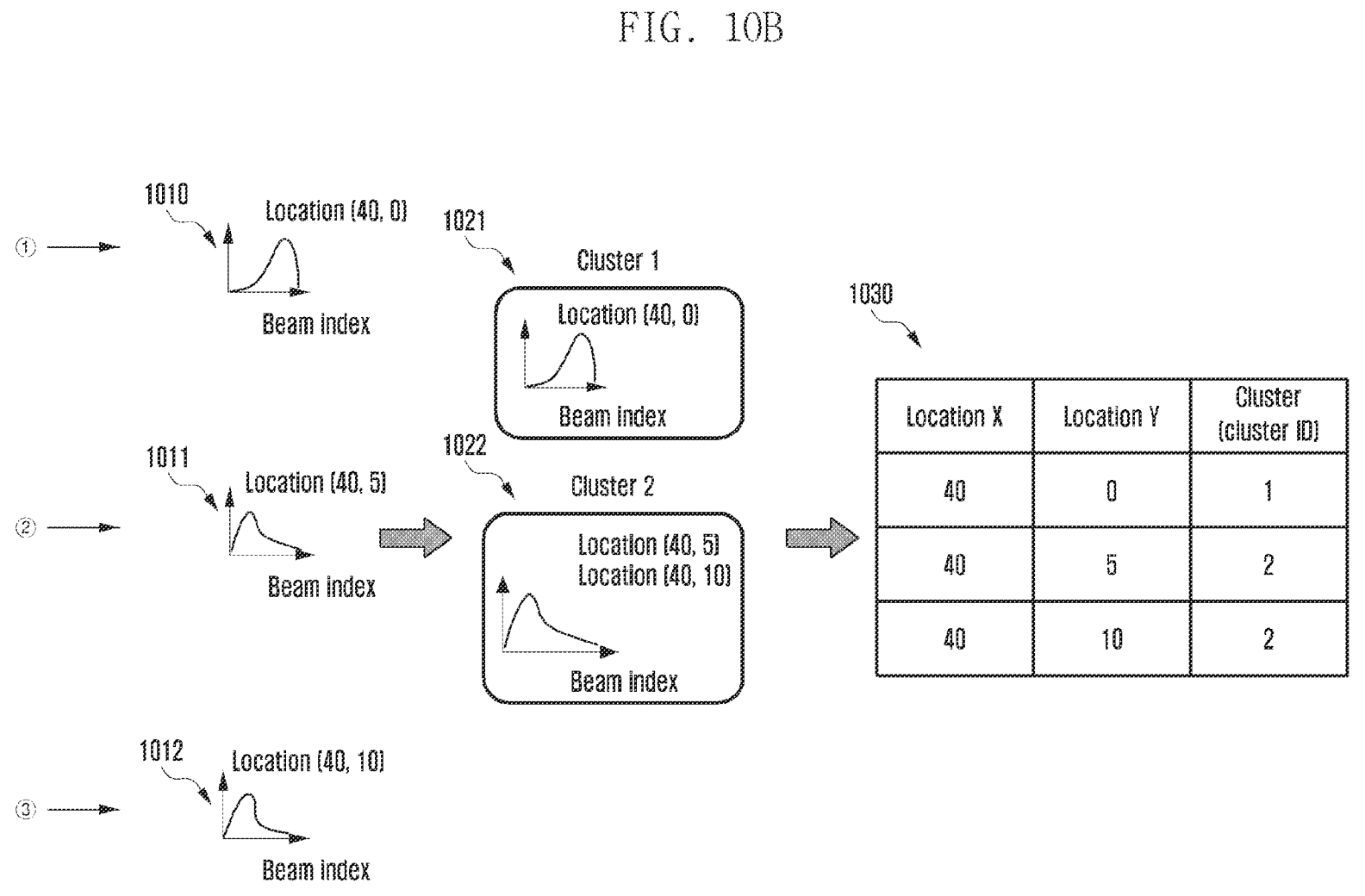

FIGS. 10A and 10B illustrate an example of a method of clustering a location-specific beam pattern in order to perform beam tracking according to an embodiment of the disclosure.

Referring to FIG. 10A, a base station may transmit/receive signals to/from terminals located in different locations served within its own coverage 1000. The base station may receive information about the best beam at the corresponding location from each terminal. The base station may identify, based on the information about the best beam received from the terminal, the number of times the corresponding beam is selected for each beam index at the location of the terminal, and store the number of times of selection in a database (DB) or in the form of a table. For convenience of explanation, as shown in FIG. 10A, a system in which the coverage of the base station is segmented into a grid structure 1000 with an interval of 5 m may be assumed. Accordingly, each of subdivided grids 1001, 1002, and 1003 may be expressed in two-dimensional coordinates such as (X, Y). Meanwhile, the coverage segmentation method as described above is provided for convenience in describing an embodiment of the disclosure, and the disclosure is not limited thereto. That is, a system in which the subdivision interval (e.g., 2 m, 3 m, etc.) or structure (e.g., grid structure etc.) is determined based on the communication environment (e.g., the number of terminals within coverage, the number of neighboring base stations, signal strength, etc.), and the coverage 1000 is subdivided accordingly may be assumed. Meanwhile, the location according to the above-described grid structure may imply a location obtained by converting location information of a terminal, which is identified by global positioning system (GPS) information and the like, according to predetermined mapping information (or a mapping table). For example, when the location of the terminal is identified by GPS information, the location according to the grid structure may correspond to a converted value (coordinates) identified by applying the GPS information to predetermined mapping information. Meanwhile, clustering, which will be described later, may be performed based on a location according to the grid structure. For example, locations corresponding to (5,0) and (0,5) according to the grid structure may be included in the same cluster according to a result of performing clustering. In this case, each of the locations (5,0) and (0,5) may correspond to the cluster.

The base station may receive information about the best beam at the corresponding location from each of terminals 1001, 1002, and 1003 located in each of the subdivided grids 1001, 1002, and 1003. Based on the information about the best beam received from the terminals 1001, 1002, and 1003, the base station may identify the number of times the corresponding beam is selected as the best beam for each beam index at the location of the corresponding terminals 1001, 1002, and 1003, and may store the number of times of the selection for each beam index in the form of tables 1005, 1006, and 1007 as shown in [Table 11] below. For example, in the case of the location (40, 0), the number of times of the selection for each beam index may be stored (or identified) in the base station in the following form of table. Meanwhile, in FIGS. 10A and 10B of the disclosure, it is assumed that clustering according to the disclosure is performed based on the number of selections of beams having beam indices of 0, 1, 2, and 3 for convenience of explanation, but the disclosure is not limited thereto. That is, clustering according to the disclosure may be performed by considering the number of selections for all beams that can be selected at the location of the terminal (i.e., the number of selections for all beam indices).

TABLE 11

| Location | Beam index | Selection times(count) |
|----------|------------|------------------------|
| (40, 0)  | 0          | 100                    |
|          | 1          | 300                    |
|          | 2          | 2000                   |
|          | 3          | 1900                   |
|          | . . .      | . . .                  |

Referring to FIG. 10B, the base station may, based on the stored (identified) table, generate (or identify) beam patterns 1010, 1011, and 1012 according to the corresponding location (i.e., a probability distribution in which a beam is selected). Meanwhile, in the disclosure, a beam pattern may imply a probability vector indicating a probability, in which a beam is selected at a corresponding location, according to each beam index. For example, [Table 11] may show a probability vector of $$\left[ 0.023\left( \frac{100}{100 + 300 + 2000 + 1900} \right), 0.070\left( \frac{300}{100 + 300 + 2000 + 1900} \right), \right.$$
$$\left. 0.465\left( \frac{2000}{100 + 300 + 2000 + 1900} \right), 0.442\left( \frac{1900}{100 + 300 + 2000 + 1900} \right), \dots, \dots \right]$$

in the order of beam index. Meanwhile, the base station may generate the beam patterns 1010, 1011, and 1012 based on various methods (e.g., various statistical techniques), and the disclosure is not limited thereto.

The base station may perform clustering such that beam patterns, which are identified as identical or similar based on a predetermined criterion among the generated beam patterns 1010, 1011, and 1012 are included in the same cluster. In the disclosure, clustering may be referred to by terms having the same or similar meanings, such as clustering, aggregation, groupage, and grouping. In addition, in the disclosure, when determining whether beam patterns are the same or similar, the base station may use a similarity calculation method according to Euclidean distance calculation, a similarity calculation method according to cosine similarity calculation, or various methods for determining the similarity between entities. For example, when the Euclidean distance value between the generated beam patterns 1011 and 1012 is equal to or less than a predetermined threshold or the cosine similarity value is equal to or greater than a predetermined threshold, the base station may perform clustering to allow the beam patterns to be included in the same cluster 1022. Alternatively, when the Euclidean distance value between the generated beam patterns 1010 and 1011 is equal to or greater than a predetermined threshold or the cosine similarity value is equal to or less than a predetermined threshold, the base station may perform clustering to allow the beam patterns to be included in different clusters 1021 and 1022, respectively. Alternatively, as a result of applying the above-described similarity determination method to the randomly generated probability distribution (or probability vector), when beam patterns have a similarity value equal to or greater than a predetermined threshold, the clustering may be performed therefor so that they are included in the same cluster 1022. In addition, as a result of applying the above-described similarity determination method to the randomly generated probability distribution (or probability vector), when beam patterns have a similarity value equal to or greater than a predetermined threshold, the clustering may be performed therefor so that they are included in different clusters 1021 and 1022, respectively. Meanwhile, the base station may perform clustering according to the disclosure based on various machine learning algorithms. For example, the base station may perform clustering according to the disclosure based on a K-means clustering algorithm among machine learning algorithms (here, K may imply the number of clusters), and in this case, a process as shown in [Table 12] may be performed.

TABLE 12

Allocate predetermined K cluster center points (which may refer to randomly generated probability vectors) in space
Calculate a Euclidean distance value or cosine similarity value between each center point and a generated beam pattern
Based on the calculated Euclidean distance value or cosine similarity value, include (or allocate) the generated beam pattern in a cluster to which center points having the closest distance (i.e., the highest similarity) belong
Calculate K center points again for each cluster, and calculate the Euclidean distance value or cosine similarity value between each center point and the generated beam pattern
Based on the calculated Euclidean distance value or cosine similarity value, identify whether the cluster including the generated beam pattern is changed
When the cluster including the generated beam pattern is changed, allocate the generated beam pattern to the changed cluster
Calculate K center points again, and calculate the Euclidean distance value or cosine similarity value between each center point and the generated beam pattern
when the cluster including the generated beam pattern does not change, terminate algorithm and output a clustering result (cluster information)

Meanwhile, in the disclosure, when a base station performs clustering of location-specific beam patterns, the number of clusters (K) may be determined according to various criteria. For example, the base station may pre-determine a random value as the number of clusters and perform clustering based on the determined number of clusters. Alternatively, the base station may determine a random value as the number of clusters (e.g., a maximum of 64) and perform clustering by increasing or decreasing the determined number of clusters by a predetermined number every predetermined time. As a result of performing clustering according to the increased or decreased number of clusters, when a predetermined number of random accesses or more (e.g., random access due to beam failure) of a terminal within the coverage of the base station occurs, the base station may change (increase or decrease) the number of clusters to perform clustering. Alternatively, the number of clusters may be determined based on at least one of the number of terminals within the coverage of the base station, a channel state with the terminal, the degree of channel load, and network congestion. In addition, when the base station performs clustering of a location-specific beam pattern based on the machine learning algorithm (e.g., K-means clustering algorithm) as described above, a performance value of clustering may be calculated for each number of clusters, and "K" may be determined as the number of clusters having the highest performance value or a predetermined performance value or more. For example, when the base station uses a K-means clustering algorithm, the number of clusters with a silhouette value closes to 1 may be determined. Thereafter, the base station may identify the beam patterns 1021 and 1022 for each cluster as a result of clustering. A beam pattern for each cluster may imply a beam pattern corresponding to a corresponding cluster, may correspond to any one of location-specific beam patterns belonging to the cluster, or may imply a beam pattern being generated (identified) by applying various statistical techniques such as averaging and normalization of location-specific beam patterns belonging to the cluster and having representativeness with respect to the location-specific beam patterns belonging to the cluster.

After performing clustering; the base station may store information indicating which cluster each location belongs to in the form of a table 1030 as shown in [Table 13], based on a result of the clustering. Meanwhile, in the disclosure, a table 1030 indicating a clustering result may be referred to as a table 1030 including mapping information between a location and a cluster (or information on a correspondence therebetween), a mapping table 1030, cluster information for each location, or cluster information, and may be referred to as a term having the same or similar meaning thereof. Hereinafter, this will be referred to as cluster information.

TABLE 13

| Location | Cluster ID |
|----------|-----------|
| (10, 20) | 1 |
| (20, 30) | 2 |
| (30, 20) | 3 |
| (20, 10) | 4 |
| . . . | . . . |

The base station may provide (or transmit) the cluster information 1030 to the terminal through a higher-level message such as an RRC message, and the terminal may perform beam tracking proposed in the disclosure based on the cluster information 1030. Hereinafter, a detailed operation of performing beam tracking by a terminal and a base station according to the disclosure based on the above-described cluster information will be described.

First, operations of a terminal and a base station for generating (or acquiring, determining) the above-described cluster information will be described.

Figure 11:
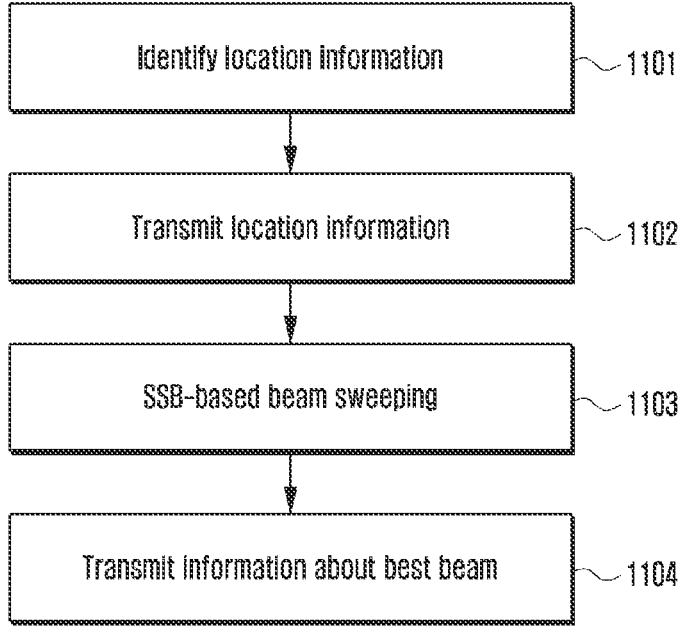
FIG. 11 illustrates a sequence of a process in which a terminal transmits location information and information on a best beam at a corresponding location to a base station according to an embodiment of the disclosure.

FIG. 11 illustrates a sequence of a process in which a terminal transmits location information and information on a beam pattern at a corresponding location to a base station according to an embodiment of the disclosure.

In operation 1101, the terminal may identify (or, generate or obtain) the location information of the terminal based on various methods. For example, the terminal may identify the location information based on global positioning system (GPS) information received from a satellite. In this case, the location information may refer to information identified by a predetermined table including the GPS information itself or a correspondence between the GPS information and the location of the terminal. Alternatively, the location information may be identified based on a channel frequency response or a power delay profile. The channel frequency response refers to an amplitude value of a subcarrier in a frequency band, and location information of the terminal may be identified based on the amplitude value of the subcarrier for each frequency band received for a predetermined period of time. The power delay profile refers to a time during which a signal transmitted to the terminal arrives at the terminal, and the strength of the signal. Although the radio waves are transmitted at the same time, they arrive at a receiver through various paths at different times, and thus the location information of the terminal may be identified based on the time taken until the signal arrives at the terminal and the strength of the signal. Meanwhile, in the disclosure, the location information of the terminal may imply that a value identified based on a channel frequency response or a power delay profile is converted as location information according to predetermined mapping information (or a mapping table). On the other hand, in case that the terminal may identify the location information by itself or already know the location information, operation 1101 may be omitted, and operation 1102 to be described later may be performed immediately. Alternatively, operation 1101 may be performed simultaneously with operation 1102 to be described later.

In operation 1102, the terminal may include the location information identified in operation 1101 in a measurement report and transmit the same to the base station.

In operation 1103, as described with reference to FIGS. 6 to 7, the terminal may perform SSB-based beam sweeping. The terminal may receive each SSB included in an SSB burst transmitted from the base station while maintaining a reception beam, and measure a channel quality thereof (here, the channel quality may include a channel state, signal strength, etc.) In addition, the terminal may receive SSBs included in the SSB burst by alternately and sequentially or randomly using its own reception beam with respect to each SSB burst as the method described above, and measure the channel quality thereof. The terminal may store information on each downlink reception/transmission beam pair (e.g., information on a downlink reception beam, information on a downlink transmission beam, a corresponding downlink reception/transmission beam pair) As a result of measuring the received signal strength of the SSB, the channel quality of the corresponding downlink reception/transmission beam pair may be stored). In this case, the terminal may store the above-described information on the downlink reception/transmission beam pair in the beam database (DB) in the form of a table as shown in [Table 10].

In operation 1104, when the CSI report is triggered, the terminal may identify information on the best beam or information on the top-ranked N beams in terms of performance at the corresponding time point, based on a beam DB or table including information on a downlink reception/transmission beam pair, and include the information in the CSI report and transmit the same to the base station. Meanwhile, the information about the best beam may include an index of the best transmission beam, an index of the best reception beam, or index of each best transmission/reception beam, and may include channel quality information (CQI) for the best beam. In addition, the information on the N beams with good performance may imply information about beams corresponding to N beams having top-ranked signal strengths or channel qualities in a descending order based on a result obtained by measuring the signal strengths or channel qualities of different transmission beams. In this case, N may be predetermined, may be configured through a higher-level message such as an RRC message, and may be indicated by control information transmitted from the base station.

Meanwhile, operations 1101 to 1104 illustrated in FIG. 11 may be partially omitted or may be performed simultane-ously. In addition, operations 1101 to 1104 may be performed periodically every predetermined period, or when the base station determines that cluster information needs to be updated and the execution of operations 1101 to 1104 is triggered, the operations may be performed aperiodically.

Meanwhile, in FIG. 11, when the terminal transmits GPS information as location information, the number of bits of the GPS information is large, and an overhead may occur when the terminal reports the location information to the base station. In this regard, the terminal according to an embodiment of the disclosure may measure the signal strength of a reference signal (e.g., reference signal received power (RSRP), etc.) transmitted from a neighboring base station (e.g., an NR gNB or an LTE eNB), and may transmit a list of signal strength measurement results of the reference signal to the base station. Here, the list of signal strength measurement results of the reference signal may be shown as in [Table 14] below.

TABLE 14

| Base Station ID | RSRP(dBm) |
|---|---|
| 1 | −68 |
| 2 | −92 |
| 3 | −58 |
| 4 | −63 |
| . . . | . . . |

Figure 12:
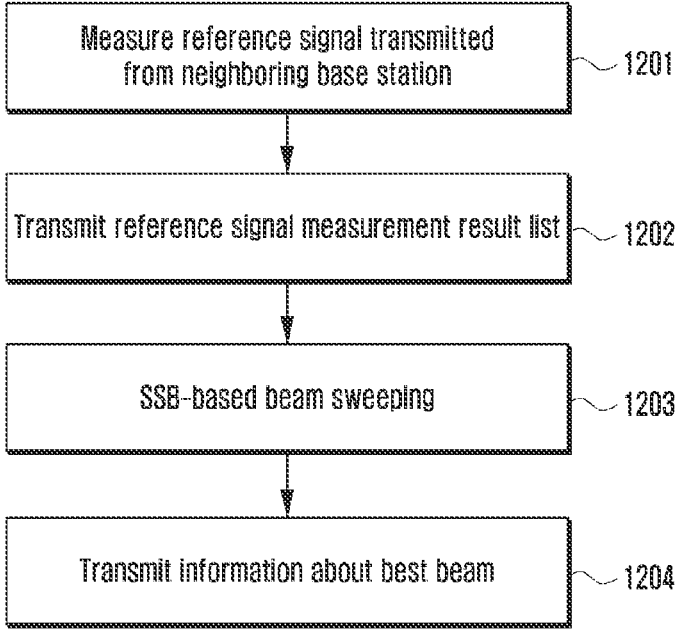
FIG. 12 illustrates a sequence of a process in which a terminal transmits a list of signal strength measurement results of a reference signal and information on a best beam at a corresponding location to a base station according to an embodiment of the disclosure.

The reason that the base station can determine the location of the terminal based on the reference signal strength measurement result list is that the signal strength, such as the RSRP value, is a value determined according to the distance and the location of the terminal may be identified based on a plurality of RSRP values. Specifically, the base station may identify the location of the terminal by applying various positioning techniques, such as triangulation, to a plurality of measured RSRP values. Alternatively, by comparing a plurality of measured RSRP values with RSRP pre-stored in a database (DB), the base station may identify a location having a similar RSRP value as the location of the terminal. With reference to FIG. 12, an operation of the terminal will be described in detail when the base station identify the location information of the terminal based on the list of strength measurement results of the reference signal transmitted by the terminal.

FIG. 12 illustrates a sequence of a process in which a terminal transmits a list of signal strength measurement results of a reference signal and information on a beam pattern at a corresponding position to a base station according to an embodiment of the disclosure.

Unlike FIG. 11 in which GPS information, etc. as the location information of the terminal are transmitted to a base station through a CSI report, FIG. 12 illustrates an embodiment in which a terminal measures the signal strength (e.g., RSRP) of a reference signal transmitted from a neighboring base station, and a base station identifies the location information of the terminal based on a list of the signal strength measurement results of the reference signal, transmitted to the base station.

Referring to FIG. 12, in operation 1201, the terminal may measure the signal strength (e.g., may refer to RSRP, RSRQ, etc.) of a reference signal received from an NR gNB or an LTE eNB, and may identify (or obtain) a list of the signal strength measurement results of the reference signal as shown in [Table 14] described above.

In operation 1202, the terminal may report the signal strength measurement result list of the reference signal to the base station through a measurement report.

In operation 1203, as described with reference to FIGS. 6 to 7, the terminal may perform SSB-based beam sweeping. The terminal may receive each SSB included in the SSB burst received from the base station while maintaining the reception beam, and measure the channel quality thereof (here, the channel quality may include a channel state, signal strength, etc.). In addition, the terminal may receive SSBs included in the SSB burst by alternately and sequentially or randomly using its own reception beam with respect to each SSB burst as the method described above, and measure the channel quality thereof. The terminal may store information on each downlink reception/transmission beam pair (e.g., information on a downlink reception beam, information on a downlink transmission beam, a result of measuring the signal strength of the SSB received through the corresponding downlink reception/transmission beam pair, the channel quality of the corresponding downlink reception/transmission beam pair may be included). Here, the terminal may store the aforementioned information on the downlink reception/transmission beam pair in a beam database (DB) in the form of a table as shown in [Table 10] described above.

In operation 1204, when the CSI report is triggered, the terminal may identify information on the best beam or information on the top-ranked N beams in terms of performance at the corresponding time point, based on a beam DB or table including information on a downlink reception/transmission beam pair, and include the information in the CSI report and transmit the same to the base station.

Meanwhile, operations 1201 to 1204 illustrated in FIG. 12 may be partially omitted or may be performed simultaneously. In addition, operations 1201 to 1204 may be performed periodically every predetermined period, or when the base station determines that cluster information needs to be updated and the execution of operations 1201 to 1204 is triggered, the operations may be performed aperiodically.

In addition, the terminal of the disclosure may selectively transmit the location information of FIG. 11 or a list of the signal strength measurement results of the reference signal of FIG. 12 to the base station. On the other hand, when GPS information is transmitted, the base station may convert the location information of the terminal, which is identified based on the received GPS information or a list of the signal strength measurement results of the reference signal, into relative location information through a table (or, function and the like) including predetermined mapping information and determine the converted location information as the location information of the terminal. That is, the base station may unify the location information of the terminal, which is expressed as the GPS information or the list of signal strength measurement results of the reference signal through a table (or a function) including the predetermined mapping information, into one unit, and may store the same in the DB and manage. In addition, unlike in FIG. 12, in which the terminal transmits the list of the reference signal strength measurement results to the base station, the terminal may measure the signal strength of the reference signals received from the neighboring base station and identify its own location information based on triangulation, or may identify its own location information by referring to the signal strength-related DB stored in the terminal, include the identified location information in a measurement report, and transmit the same. In this case, the terminal may perform an operation according to FIG. 11.

The base station may generate a location-specific beam pattern based on the information about a best beam and the location information of the terminal received from the terminal, and may cluster the generated beam pattern. A detailed base station operation will be described with reference to FIG. 13.

Figure 13:
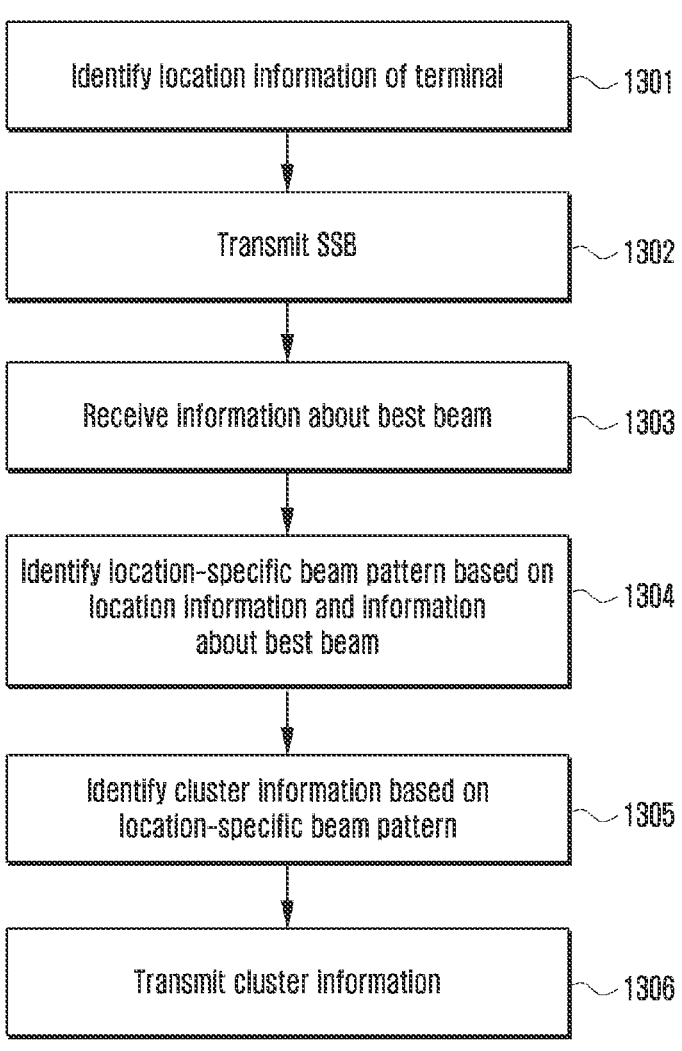
FIG. 13 illustrates a sequence of a process in which a base station identifies a location-specific beam pattern based on location information of a terminal and information on a best beam, and clusters the beam pattern according to an embodiment of the disclosure.

FIG. 13 illustrates a sequence of a process in which a base station identifies a location-specific beam pattern based on location information of a terminal and information on a best beam, and clusters the beam pattern according to an embodiment of the disclosure.

Referring to FIG. 13, in operation 1301, a base station may receive location information of a terminal according to FIG. 11 or a list of signal strength measurement results of a reference signal according to FIG. 12 through a measurement report from the terminal. The base station may store the location information in a DB or in the form of a table.

In operation 1302, the base station may transmit to the terminal an SSB burst including at least one SSB corresponding to each of the different transmission beams.

In operation 1303, the base station may receive, from the terminal, information about the best beam or the top-ranked N beams in terms of performance, which is identified based on the result of measuring the channel quality of the SSB burst transmitted in operation 1302 by triggering CSI reporting or every CSI reporting period, and may store the received information in a DB in the form of a table. Meanwhile, the above described information about the best beam or information on the top-ranked N beams in terms of performance may be included in the CSI report and reported to the base station from the terminal.

In operation 1304, the base station may generate (or, identify, obtain, determine) a beam pattern at the corresponding location based on the location information of the terminal identified in operation 1301 and information about the best beam or information on the top-ranked N beams in terms of performance received in operation 1303.

In operation 1305, the base station may perform clustering based on the beam pattern generated in operation 1304. The base station may cluster the beam pattern, having been generated in operation 1304, based on various methods. For example, the base station may allow beam patterns, which are determined to be similar to the pattern generated in operation 1304 by a predetermined threshold or more, to be included in the same cluster. Meanwhile, in the disclosure, a method for clustering a beam pattern by a base station is not limited, and may be performed based on various machine learning algorithms or artificial intelligence systems. Since the detailed clustering process has been described with reference to FIGS. 10A and 10B, it will be omitted herein. The base station may identify a beam pattern for each cluster based on a result of the clustering of operation 1305. A beam pattern for each cluster may imply a beam pattern corresponding to a corresponding cluster, may correspond to any one of location-specific beam patterns belonging to the cluster, or may imply a beam pattern being generated (identified) by applying various statistical techniques such as averaging and normalization of location-specific beam patterns belonging to the cluster and having representativeness with respect to the location-specific beam patterns belonging to the cluster. In addition, the base station may obtain cluster information indicating which cluster each location belongs to (or, a cluster corresponding to each location) based on a result of the clustering. The cluster information may include information about a location and a cluster to which the corresponding location belongs (e.g., a cluster ID), and information on a correspondence between the location and the cluster.

In addition, in operation 1306, the base station may transmit the cluster information obtained in operation 1305 to the terminal through a higher-level message such as an RRC message. Meanwhile, operations 1301 to 1306 illustrated in FIG. 13 may be partially omitted or may be performed simultaneously. In addition, operations 1301 to 1306 may be performed periodically every predetermined period, or when the base station determines that cluster information needs to be updated and the execution of operations 1301 to 1306 is triggered, the operations may be performed aperiodically FIG. 14 illustrates an overall flow of a process in which a base station acquires cluster information according to an embodiment of the disclosure.

Figure 14:
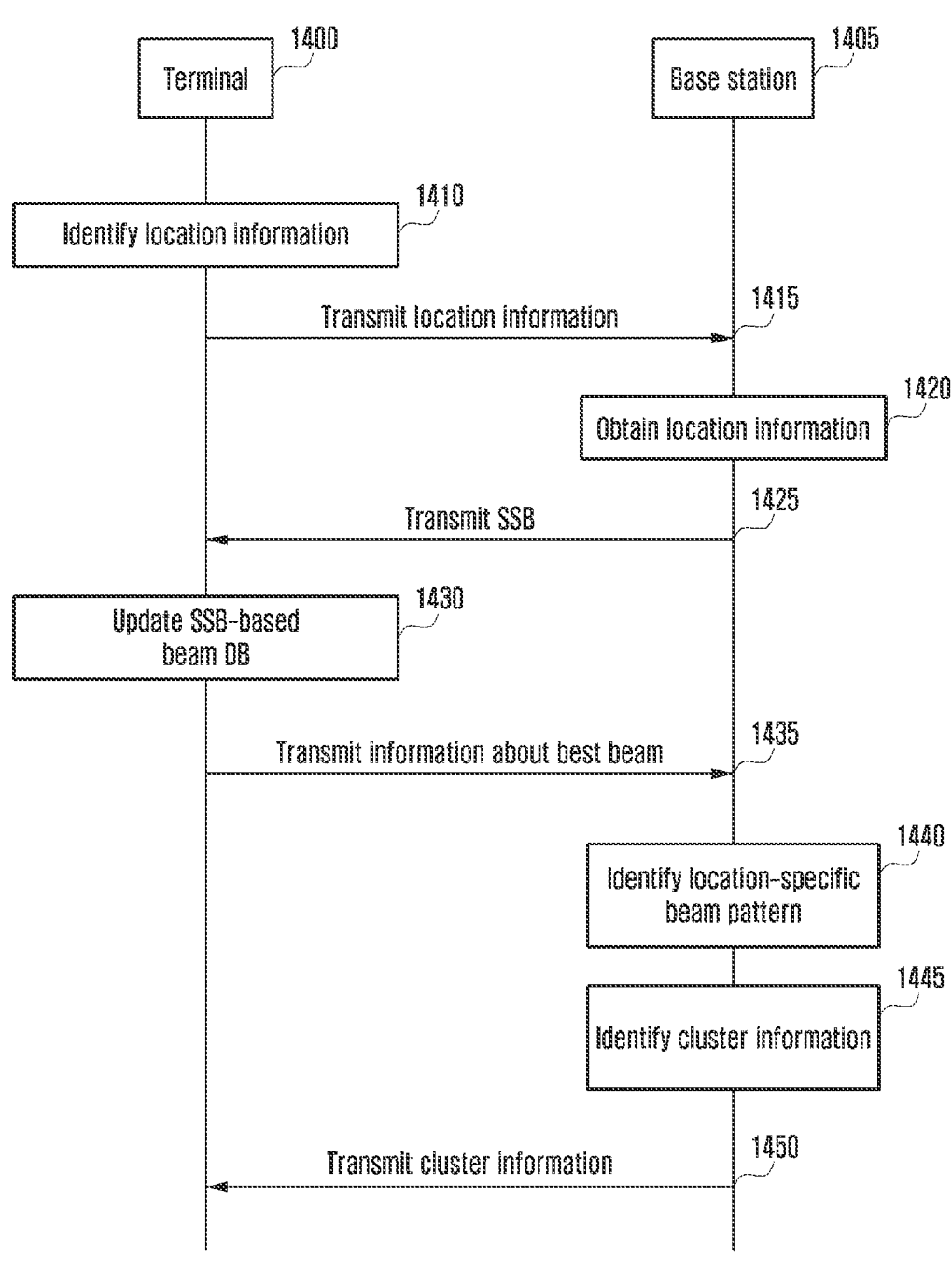
FIG. 14 illustrates an overall flow of a process in which a base station acquires cluster information according to an embodiment of the disclosure.

Referring to FIG. 14, in operation 1410, a terminal 1400 may identify location information. Meanwhile, the location information may include GPS information received from a satellite, as described above with reference to FIG. 11. Alternatively, the location information may include information on the location of the terminal 1400 identified based on a result of measuring the signal strength of reference signals received from a neighboring base station. In operation 1415, the terminal 1400 may include the identified location information in a measurement report and report the same to a base station 1405.

In operation 1420, the base station 1405 may store the location information of the terminal 1400 received in operation 1415 in a DB or in the form of a table. On the other hand, in case that the base station 1405 receives a list of the signal strength measurement results of the reference signal from the terminal 1400 in operation 1415, the base station 1405 may store the list of the signal strength measurement results of the reference signal in the DB or in the form of a table.

In operation 1425, the base station 1405 may transmit an SSB burst including at least one SSB corresponding to each of the different transmission beams to the terminal 1400.

In operation 1430, the terminal 1400 may update the beam DB by performing SSB-based beam sweeping. The terminal 1400 may receive each SSB included in the SSB burst transmitted from the base station 1405 in operation 1425 while maintaining the reception beam, and measure the channel quality thereof (here, the channel quality may include a channel state, signal strength, etc.). In addition, the terminal 1400 may receive SSBs included in the SSB burst by alternately and sequentially or randomly using its own reception beam with respect to each SSB burst as the method described above, and measure the channel quality thereof. The terminal 1400 may store information on each downlink reception/transmission beam pair (e.g., information on a downlink reception beam, information on a downlink transmission beam, a result of measuring the signal strength of the SSB received through the corresponding downlink reception/transmission beam pair, the channel quality of the corresponding downlink reception/transmission beam pair may be included). Here, the terminal 1400 may store the aforementioned information on the downlink reception/transmission beam pair in a beam database (DB) in the form of a table as shown in [Table 10] described above.

In operation 1435, when the CSI report is triggered, the terminal 1400 may identify information on the best beam or information on the top-ranked N beams in terms of performance at the corresponding time point, based on a beam DB or table including information on a downlink reception/ transmission beam pair, and include the information in the CSI report and transmit the same to the base station 1405.

In operation 1440, the base station 1405 may store information about the best beam or information on the top-ranked N beams in terms of performance, which is received through the CSI report, in the DB or in the form of a table. In this case, the base station 1405 may store the location information of the terminal stored in operation 1430 to correspond to the information about the best beam or the information on the top-ranked N beams. In this case, the base station 1405 may identify the number of times (count) of being selected as the best beams for each beam index at the corresponding location based on the information about the best beam or the information on the top-ranked N beams, and store the same in the form of a table. The base station 1405 may generate (or identify, acquire, determine) a beam pattern at the corresponding location based on the stored location information of the terminal, and information about the best beam or information on the top-ranked N beams at the location.

In operation 1445, the base station 1405 may perform clustering based on the beam pattern generated in operation 1440. For example, the base station 1405 may allow beam patterns, which are determined to be similar to the pattern generated in operation 1440 by a predetermined threshold or more, to be included in the same cluster. Meanwhile, in the disclosure, the method for clustering a beam pattern by the base station 1405 is not limited, and may be performed based on various machine learning algorithms or artificial intelligence systems. Since the detailed clustering process has been described with reference to FIGS. 10A and 10B, it will be omitted herein. Meanwhile, the base station 1405 may identify a beam pattern for each cluster as a result of clustering. A beam pattern for each cluster may imply a beam pattern corresponding to a corresponding cluster, may correspond to any one of location-specific beam patterns belonging to the cluster, or may imply a beam pattern being generated (identified) by applying various statistical techniques such as averaging and normalization of location-specific beam patterns belonging to the cluster and having representativeness with respect to the location-specific beam patterns belonging to the cluster. On the other hand, in the disclosure, when a large number of beams are selected with a probability equal to or greater than a predetermined threshold in the beam pattern of a specific cluster among the beam patterns for each cluster, the base station 1405 may increase the number of beams corresponding to the CSI-RS used for beam tracking in the corresponding cluster. The base station 1405 may transmit information on the increased number of beams to the terminal. In this case, since the number of transmission beams that can be measured by the terminal 1400 at the CSI-RS timing increases, and the beams correspond to beams with a high probability of being selected as the best beam at the location of the terminal 1400, an effect similar to that obtained by performing full beam sweeping can be obtained. That is, as the number of beams corresponding to the CSI-RS increases, the possibility of obtaining information on the actual best beam at the time of CSI reporting can be increased. On the other hand, when only a specific beam is selected with a probability equal to or greater than a predetermined threshold, the base station 1405 may reduce the number of beams corresponding to the CSI-RS. In this case, information on the reduced number of beams may be transmitted to the terminal 1400. In addition, the base station 1405 may identify (or acquire) cluster information indicating which cluster each location belongs to, based on a result of clustering. The cluster information may include information about a location and a cluster to which the location belongs (e.g., a cluster ID), and information on a correspondence between the location and the clusters.

In operation 1450, the base station 1405 may transmit the cluster information identified in operation 1445 to the terminal 1400 through a higher-level message such as RRC.

Meanwhile, operations 1410 to 1450 illustrated in FIG. 14 may be partially omitted or may be performed simultaneously. In addition, a first terminal, a second terminal, or other terminals according to the disclosure may simultaneously perform operations 1410 to 1450. On the other hand, operations 1410 to 1450 may be periodically performed every predetermined period, or when the base station determines that cluster information needs to be updated and the execution of operations 1410 to 1450 is triggered, the operations may be performed aperiodically.

The base station may provide the cluster information obtained in the method described above with reference to FIGS. 11 to 14 to the terminal, and determine a beam corresponding to a CSI-RS according to each cluster. That is, since a beam corresponding to the CSI-RS can be determined according to each terminal location, the beam tracking performance can be improved more efficiently. In addition, only in case that cluster change occurs due to the movement of the terminal, the base station is notified of only the cluster change so as to change a beam corresponding to the CSI-RS, and thus signaling overhead can be greatly reduced. Hereinafter, a method for performing beam tracking by a terminal and a base station based on cluster information according to the disclosure will be described in detail.

Figure 15:
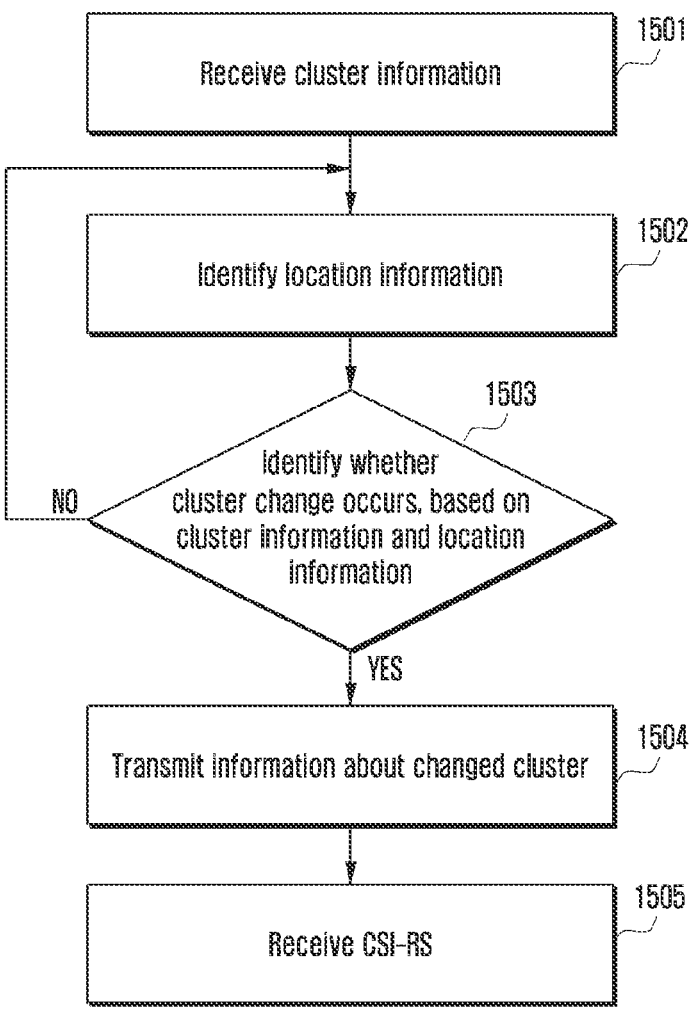
FIG. 15 illustrates a sequence of a process in which a terminal performs beam tracking based on location information and cluster information which is received from a base station according to an embodiment of the disclosure.

FIG. 15 illustrates a sequence of a process in which a terminal performs beam tracking based on location information and cluster information which is received from a base station according to an embodiment of the disclosure.

Referring to FIG. 15, in operation 1501, a terminal may perform initial access to the base station, and when the initial access is completed, the terminal may receive cluster information from a base station through a higher-level message such as an RRC message.

In operation 1502, the terminal may identify its own location information based on GPS information received from a satellite. Alternatively, the terminal may identify the location information by measuring the signal strength of a reference signal transmitted from a neighboring base station. As a method for identifying the location information based on the signal strength of the reference signal, for example, various positioning methods such as triangulation or a method for identifying the location with reference to a previously stored signal strength-related DB may be used.

In operation 1503, the terminal may identify whether a cluster to which the location of the terminal belongs has been changed, based on the cluster information received in operation 1501 and the location information identified in operation 1502. For example, the terminal may identify whether a cluster ID has been changed according to the location of the terminal based on the information on the correspondence between the location and the cluster ID included in the cluster information, and the identification may be performed based on whether the cluster ID stored in the terminal and the identified cluster ID are the same or different.

When it is identified that a cluster corresponding to the location of the terminal is changed, the terminal may include information about the changed cluster (e.g., the changed cluster ID), when a CSI report is triggered, in the CSI report and transmit the same to the base station, in operation 1504.

Alternatively, GPS information may be transmitted to the base station. In this case, the base station may identify that the cluster corresponding to the location of the terminal is changed according to the received GPS information. Meanwhile, when it is identified that the cluster to which the location of the terminal belongs is not changed, operation 1504 may be omitted.

Meanwhile, information about the changed cluster reported by the terminal to the base station may be used to change a beam corresponding to a CSI-RS. That is, in operation 1505, as described above in FIGS. 6 to 7, the terminal may receive a CSI-RS corresponding to a changed beam based on the information about the changed cluster, measure the channel quality thereof, and then store the same in a beam DB in the form of a table as shown in [Table 10]. Since the details have been described above, a description thereof will be omitted here.

Meanwhile, operations 1501 to 1505 illustrated in FIG. 15 may be partially omitted or may be performed simultaneously. In addition, operations 1501 to 1505 may be periodically performed by the terminal every predetermined period, and in this case, the period may be shorter than a period in which the base station updates cluster information.

When the base station receives information about the changed cluster from the terminal, the base station may perform a process of changing the beam corresponding to the CSI-RS. Hereinafter, it will be described in detail with reference to FIG. 16.

Figure 16:
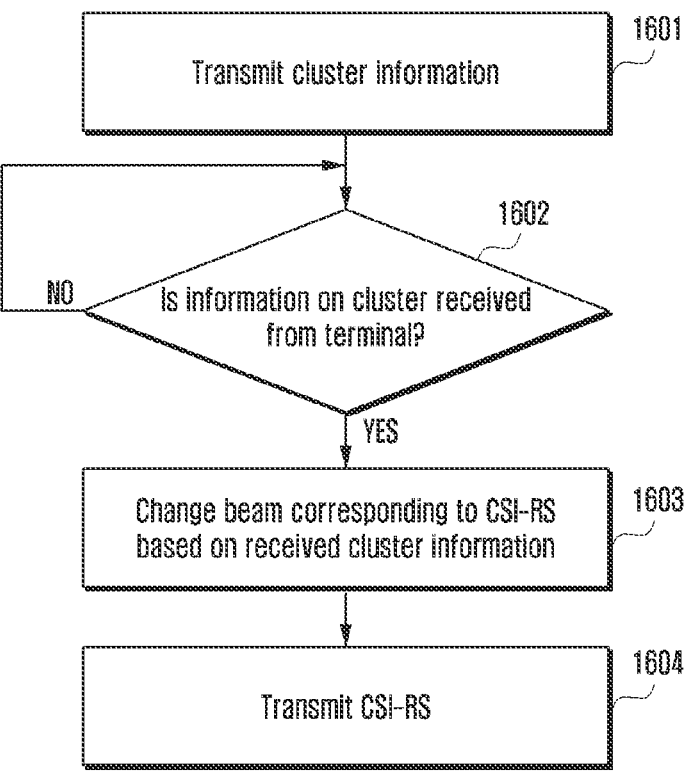
FIG. 16 illustrates a sequence of a process in which a base station changes a beam corresponding to a CSI-RS according to an embodiment of the disclosure.

FIG. 16 illustrates a sequence of a process in which a base station changes a beam corresponding to a CSI-RS according to an embodiment of the disclosure.

Referring to FIG. 16, in operation 1601, the base station may transmit cluster information through a higher-level message such as an RRC message after an initial access procedure of a terminal is completed.

Thereafter, in operation 1602, the base station may receive a CSI report from the terminal, and may identify whether information about the changed cluster (e.g., ID of the changed cluster) is included in the CSI report. Alternatively, the base station may identify whether the GPS information of the terminal is included in the CSI report. In case that information about the changed cluster (or GPS information) is included in the CSI report, the base station may perform operation 1603 which will be described later. Alternatively, a case in which the information about the changed cluster is not included in the CSI report may imply that a cluster to which the location of the terminal belongs is not changed, and thus the base station may standby to receive the next CSI report (that is, the base station may perform operation 1602).

When it is identified that the information about the changed cluster is included in the CSI report received in operation 1602, the base station may change a beam corresponding to a CSI-RS based on the information about the changed cluster in operation 1603. On the other hand, when GPS information is included in the CSI report, the base station may identify information about the changed cluster based on the location of the terminal according to the GPS information. Specifically, the base station may identify a beam pattern of the changed cluster by referring to information about the changed cluster in the stored cluster information. Thereafter, based on the identified beam pattern, the base station may identify at least one beam with a high probability of being selected as the best beam (e.g., the top-ranked N beams with a high probability of being selected as the best beam, or a beam to be selected as the best beam with a probability equal to or greater than a predetermined threshold value) and determine the identified at least one beam as a beam corresponding to the CSI-RS. Here, in the disclosure, determining the beam corresponding to the CSI-RS based on the beam pattern may be understood as determining at least one beam, which is identified by sampling a beam according to a predetermined criterion in a beam pattern implying a probability distribution, as a beam corresponding to the CSI-RS. For example, when there are N beam indices selected as the best beam with a predetermined probability or more, and there are K beam indices that may correspond to CSI-RS, K beams may be sampled from among the N beams randomly or in various methods and determined as a beam corresponding to the CSI-RS.

In operation 1604, the base station may transmit the CSI-RS corresponding to the beam determined in operation 1603 to the terminal. Here, the base station may identify information on the CSI-RS (e.g., CSI-RS-Resource ID) corresponding to the determined beam based on the TCI state information, and transmit the CSI-RS identified according to the information on the CSI-RS to the terminal. The terminal may receive the CSI-RS, measure the channel quality, and then store the same in a DB in the form of a table as shown in [Table 10]. Further, the terminal may report information about the best beam at a corresponding time point at the time of CSI reporting, and thus beam tracking according to the disclosure may be performed.

Figure 17:
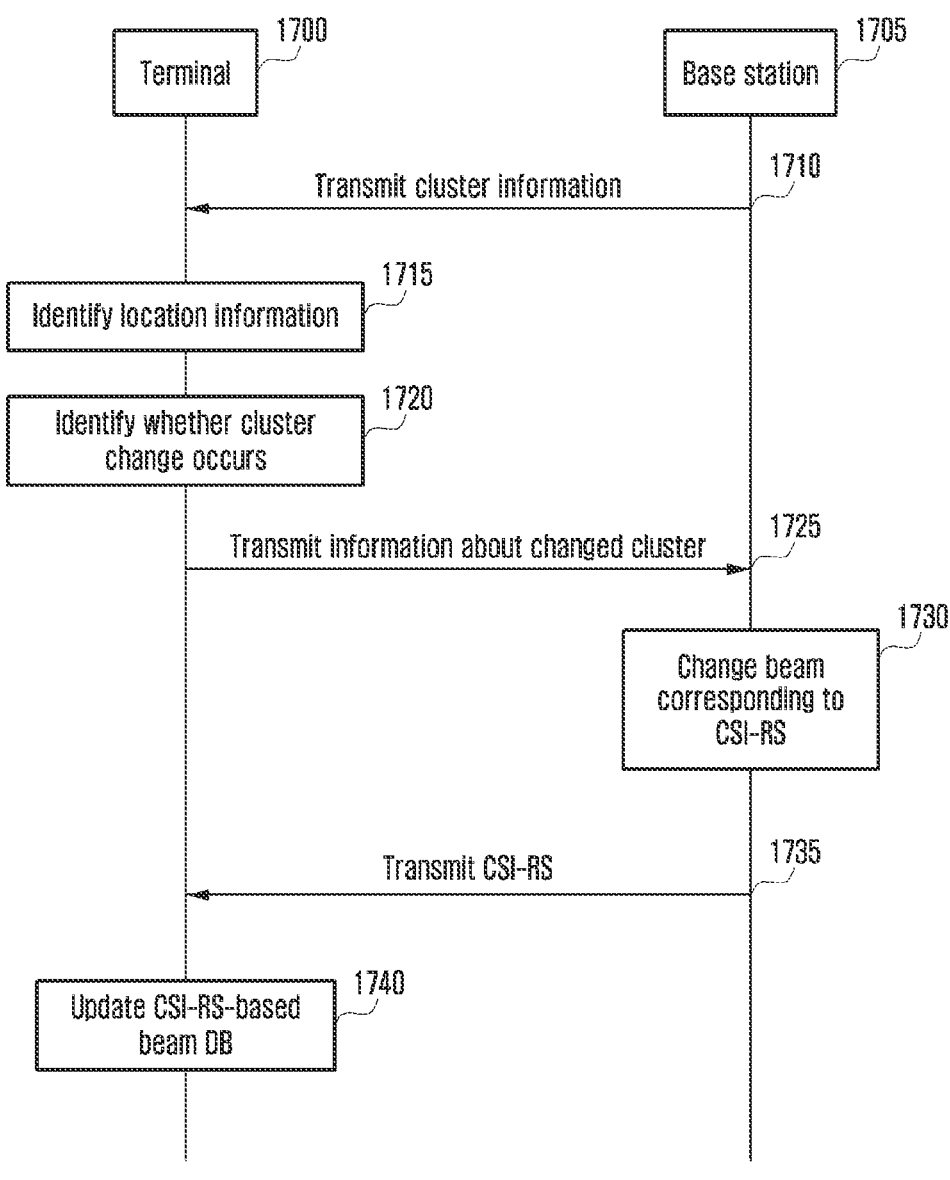
FIG. 17 illustrates an overall flow in which a terminal and a base station perform beam tracking based on cluster information according to an embodiment of the disclosure.

FIG. 17 illustrates an overall flow in which a terminal and a base station perform beam tracking based on cluster information according to an embodiment of the disclosure.

In operation 1710, a terminal 1700 performs an initial access to a base station 1705, and when the initial access is completed, the terminal 1700 may receive cluster information from the base station 1705 through a higher-level message such as an RRC message.

Referring to FIG. 17, in operation 1715, the terminal 1700 may identify its own location information based on GPS information received from a satellite. Alternatively, the terminal 1700 may use a method of measuring the signal strength of a reference signal transmitted from a neighboring base station, and identifying the location of the terminal 1700 by referring to various positioning methods such as triangulation or a pre-stored signal strength-related DB.

In operation 1720, the terminal 1700 may identify whether a cluster to which the location of the terminal 1700 belongs has been changed, based on the cluster information received in operation 1710 and the location information identified in operation 1715. For example, the terminal 1700 may identify whether the cluster ID has been changed according to the location of the terminal 1700 based on the information on the correspondence between the location and the cluster ID included in the cluster information, and the identification may be performed based on whether the cluster ID stored in the terminal 1700 and the identified cluster ID are the same or different.

In operation 1725, when it is identified that a cluster corresponding to the location of the terminal 1700 is changed, the terminal 1700 may include information about the changed cluster (e.g., the changed cluster ID), when a CSI report is triggered, in the CSI report and transmit the same to the base station 1705, in operation 1725. Meanwhile, when it is identified that the cluster to which the location of the terminal belongs is not changed, operation 1725 may be omitted.

In operation 1730, the base station 1705 may identify whether information about the changed cluster (e.g., the changed cluster ID) is included in the CSI report received from the terminal 1700. In case that the information about the changed cluster is included in the CSI report, the base station 1705 may change a beam corresponding to a CSI-RS based on the information about the changed cluster. Specifically, the base station 1705 may identify a beam pattern of the changed cluster by referring to information about the changed cluster in the stored cluster information. Thereafter, based on the identified beam pattern, the base station 1705 may identify at least one beam with a high probability of being selected as the best beam (e.g., the top-ranked N beams with a high probability of being selected as the best beam, or a beam to be selected as the best beam with a probability equal to or greater than a predetermined threshold value) and determine the identified at least one beam as a beam corresponding to the CSI-RS. Here, in the disclosure, determining the beam corresponding to the CSI-RS based on the beam pattern may be understood as determining at least one beam, which is identified by sampling a beam according to a predetermined criterion in a beam pattern implying a probability distribution, as a beam corresponding to the CSI-RS. For example, when there are N beam indices selected as the best beam with a predetermined probability or more, and there are K beam indices that may correspond to CSI-RS, K beams may be sampled from among the N beams randomly or in various methods and determined as a beam corresponding to the CSI-RS. Alternatively, a case in which the information about the changed cluster is not included in the CSI report may imply that a cluster to which the location of the terminal 1700 belongs is not changed, and thus the base station 1705 may standby to receive the next CSI report. Here, operation 1730 may be omitted.

In operation 1735, the base station 1705 may transmit the CSI-RS corresponding to the beam determined in operation 1730 to the terminal. Here, the base station may identify information on the CSI-RS (e.g., CSI-RS-Resource ID) corresponding to the determined beam based on the TCI state information, and transmit the CSI-RS identified according to the information on the CSI-RS to the terminal.

In operation 1740, the terminal 1700 may receive the CSI-RS, which is transmitted from the base station 1705, measure channel quality thereof, and then store the same in a DB in the form of a table as shown in [Table 10]. Thereafter, when a CSI report is triggered, the terminal 1700 may identify information about the best beam at a corresponding time point by referring to the DB or table, include the identified information about the best beam in the CSI report and report the same to the base station 1705, so that beam tracking proposed in the disclosure can be performed.

Figure 18:
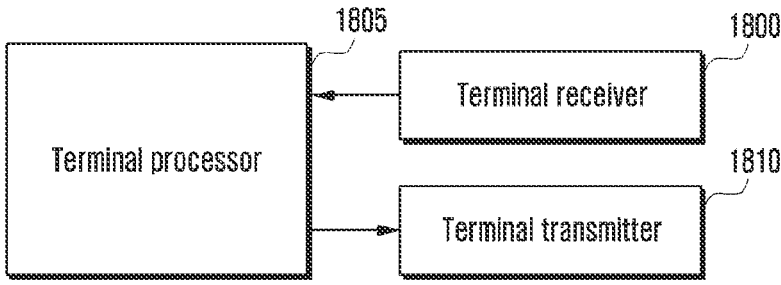
FIG. 18 illustrates the structure of a terminal according to embodiments of the disclosure.

FIG. 18 illustrates the structure of a terminal according to embodiments of the disclosure.

Referring to FIG. 18, a terminal of the disclosure may include a terminal receiver 1800, a terminal transmitter 1810, and a terminal processor 1805. The terminal receiver 1800 and the terminal transmitter 1810 may be collectively referred to as a transceiver in the embodiment of the disclosure. The transceiver may transmit/receive a signal to/from a base station. The signal may include control information and data. To this end, the transceiver may include an RF transmitter configured to up-convert and amplify a frequency of a transmitted signal, and an RF receiver configured to low-noise amplify and down-convert a received signal. In addition, the transceiver may receive a signal through a wireless channel and output the received signal to the terminal processor 1805, and may transmit a signal output from the terminal processor 1805 through a wireless channel. The terminal processor 1805 may control a series of processes so that the terminal may operate according to the above-described embodiment of the disclosure.

Figure 19:
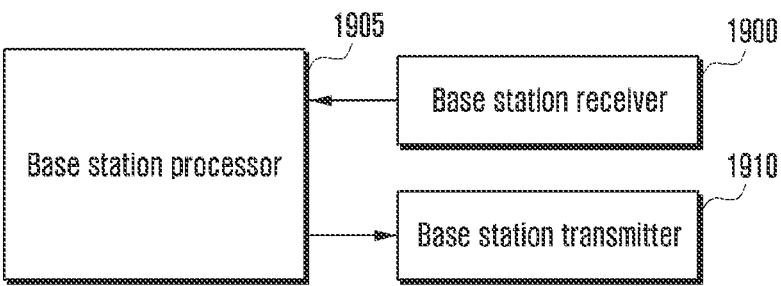
FIG. 19 illustrates the structure of a base station according to embodiments of the disclosure.

FIG. 19 illustrates the structure of a base station according to embodiments of the disclosure.

Referring to FIG. 19, a base station of the disclosure may include a base station receiver 1900, a base station transmitter 1910, and a base station processor 1905. The base station receiver 1900 and the base station transmitter 1910 may be collectively referred to as a transceiver in the embodiment of the disclosure. The transceiver may transmit/receive a signal to/from the terminal. The signal may include control information and data. To this end, the transceiver may include an RF transmitter configured to up-convert and amplify a frequency of a transmitted signal, and an RF receiver configured to low-noise amplify and down-convert a received signal. In addition, the transceiver may receive a signal through a wireless channel and output the received signal to the base station processor 1905, and transmit a signal output from the base station processor 1905 through a wireless channel. The base station processor 1905 may control a series of processes so that the base station may operate according to the above-described embodiment of the disclosure.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Furthermore, one or more of the above embodiments may be employed in combination, as necessary.

Although specific embodiments have been described in the detailed description of the disclosure, it will be apparent that various modifications and changes may be made thereto without departing from the scope of the disclosure. Therefore, the scope of the disclosure should not be defined as being limited to the embodiments, but should be defined by the appended claims and equivalents thereof.

In addition, the methods described above in FIGS. 1 to 19 of the disclosure may include methods in which at least one or more drawings are combined according to various implementations. For example, FIGS. 6 to 17 illustrate a beam tracking method according to the disclosure, and the disclosure may include methods in which at least one or more drawings are combined according to various implementations.

The invention claimed is:

1. A method performed by a terminal in a communication system, the method comprising:

transmitting, to a base station, a first message including information of a best beam at an arbitrary location;

receiving, from the base station, a second message including cluster information including at least one cluster identifier and beam patterns corresponding to each of the at least one cluster identifier, wherein the beam patterns are grouped into a respective cluster based on the information of the best beam in accordance with predefined criteria, wherein the beam patterns correspond to location specific beam patterns identified based on the arbitrary location and the information of the best beam, and wherein the predefined criteria is satisfied based on whether a Euclidean distance value between the beam patterns is less than or equal to a first threshold or a cosine similarity value is greater than or equal to a second threshold;

identifying whether a cluster identifier corresponding to a changed location of the terminal differs from a cluster identifier corresponding to a previous location of the terminal, based on the cluster information;

in case that the cluster identifier corresponding to the changed location of the terminal differs from the cluster identifier corresponding to the previous location, transmitting, to the base station, a channel state information (CSI) report including information on a changed cluster, and receiving, from the base station, a CSI reference signal (CSI-RS) based on the information on the changed cluster; and in case that the cluster identifier corresponding to the changed location of the terminal does not differ from the cluster identifier corresponding to the previous location of the terminal, determining not to transmit, to the base station, the CSI report.

2. The method of claim 1, wherein the location of the terminal is identified based on a result of measuring reference signal received power (RSRP) of a reference signal, and wherein the reference signal is transmitted by a new base station.

3. The method of claim 1, wherein the CSI-RS corresponds to at least one beam identified based on a changed beam pattern corresponding to the information on the changed cluster, and wherein the CSI-RS is identified based on information on a transmission configuration indicator (TCI) state related to the at least one beam corresponding to the CSI-RS.

4. A method performed by a base station in a communication system, the method comprising:

receiving, from a terminal, a first message including information of a best beam at an arbitrary location;

identifying location specific beam patterns based on the arbitrary location and information of the best beam;

grouping beam patterns, among the location specific beam patterns, into a respective cluster, based on the information of the best beam in accordance with predefined criteria, wherein the predefined criteria is satisfied based on whether a Euclidean distance value between the beam patterns is less than or equal to a first threshold or a cosine similarity value is greater than or equal to a second threshold;

transmitting, to the terminal, a second message including cluster information including at least one cluster identifier and the beam patterns corresponding to each of the at least one cluster identifier, wherein the beam patterns are grouped into the respective cluster; and in case that a cluster identifier corresponding to a changed location of the terminal differs from a cluster identifier corresponding to a previous location:

receiving, from the terminal, a channel state information (CSI) report including information on a changed cluster, and transmitting, to the terminal, a CSI reference signal (CSI-RS) based on the information on the changed cluster, wherein in case that the cluster identifier corresponding to the changed location of the terminal does not differ from the cluster identifier corresponding to the previous location, the CSI report is not received.

5. The method of claim 1, wherein a location of the terminal is identified based on a result of measuring reference signal received power (RSRP) of a reference signal, and wherein the reference signal is transmitted by a new base station.

6. The method of claim 4, wherein the CSI-RS is identified based on information on a transmission configuration indicator (TCI) state related to the at least one beam corresponding to the CSI-RS.

7. A terminal of a communication system, the terminal comprising:

a transceiver; and a controller connected to the transceiver, wherein the controller is configured to:

transmit, to a base station, a first message including information of a best beam at an arbitrary location;

receive, from the base station, a second message including cluster information including at least one cluster identifier and beam patterns corresponding to each of the at least one cluster identifier, wherein the beam patterns are grouped into a respective cluster based on the information of the best beam in accordance with predefined criteria, wherein the beam patterns correspond to location specific beam patterns identified based on the arbitrary location and the information of the best beam, and wherein the predefined criteria is satisfied based on whether a Euclidean distance value between the beam patterns is less than or equal to a first threshold or a cosine similarity value is greater than or equal to a second threshold;

identify whether a cluster identifier corresponding to a changed location of the terminal differs from a cluster identifier corresponding to a previous location of the terminal, based on the cluster information;

in case that the cluster identifier corresponding to the changed location of the terminal differs from the cluster identifier corresponding to the previous location:

transmit, to the base station, a channel state information (CSI) report including information on a changed cluster, and receive, from the base station, a CSI reference signal (CSI-RS) based on the information on the changed cluster; and in case that the cluster identifier corresponding to the changed location of the terminal does not differ from the cluster identifier corresponding to the previous location of the terminal, determining not to transmit, to the base station, the CSI report.

8. The terminal of claim 7, wherein the location of the terminal is identified based on a result of measuring reference signal received power (RSRP) of a reference signal, and wherein the reference signal is transmitted by a new base station.

9. The terminal of claim 7, wherein the CSI-RS corresponds to at least one beam identified based on a changed beam pattern corresponding to the information on the changed cluster, and wherein the CSI-RS is identified based on information on a transmission configuration indicator (TCI) state related to the at least one beam corresponding to the CSI-RS.

10. A base station of a communication system, the base station comprising:

a transceiver; and a controller connected to the transceiver, wherein the controller is configured to:

receive, from a terminal, a first message including information of a best beam at an arbitrary location;

identify location specific beam patterns based on the arbitrary location and information of the best beam at the arbitrary location;

group beam patterns, among the location specific beam patterns, into a respective cluster, based on the information of the best beam in accordance with predefined criteria, wherein the predefined criteria is satisfied based on whether a Euclidean distance value between the beam patterns is less than or equal to a first threshold or a cosine similarity value is greater than or equal to a second threshold;

transmit, to the terminal, a second message including cluster information including at least one cluster identifier and the beam patterns corresponding to each of the at least one cluster identifier, wherein the beam patterns are grouped into the respective cluster; and in case that a cluster identifier corresponding to a changed location of the terminal differs from a cluster identifier corresponding to a previous location:

receive, from the terminal, a channel state information (CSI) report including information on a changed cluster, and transmit, to the terminal, a CSI reference signal (CSI-RS) based on the information on the changed cluster, wherein in case that the cluster identifier corresponding to the changed location of the terminal does not differ from the cluster identifier corresponding to the previous location, the CSI report is not received.

11. The base station of claim 10, wherein a location of the terminal is identified based on a result of measuring reference signal received power (RSRP) of a reference signal, wherein the reference signal is transmitted by a new base station, and wherein the CSI-RS is identified based on information on a transmission configuration indicator (TCI) state related to the at least one beam corresponding to the CSI-RS.

* * * * *